United States Patent
von Blanckenhagen et al.

(10) Patent No.: US 11,586,053 B2
(45) Date of Patent: Feb. 21, 2023

(54) SPECTACLE LENS WITH FILTER EFFECT FOR BLUE LIGHT AND SPECTACLES

(71) Applicant: Carl Zeiss Vision International GmbH, Aalen (DE)

(72) Inventors: Bernhard von Blanckenhagen, Aalen (DE); Emad Flear Aziz, Aalen (DE)

(73) Assignee: Carl Zeiss Vision International GmbH, Aalen (DE)

(*) Notice: Subject to any disclaimer, the term of this patent is extended or adjusted under 35 U.S.C. 154(b) by 0 days.

(21) Appl. No.: 17/672,964

(22) Filed: Feb. 16, 2022

(65) Prior Publication Data

US 2022/0179237 A1 Jun. 9, 2022

Related U.S. Application Data

(63) Continuation of application No. PCT/EP2020/073255, filed on Aug. 19, 2020.

(30) Foreign Application Priority Data

Aug. 21, 2019 (EP) .................. 19192734

(51) Int. Cl.
*G02C 7/02* (2006.01)
*B29D 11/00* (2006.01)
*G02C 7/10* (2006.01)

(52) U.S. Cl.
CPC .......... *G02C 7/02* (2013.01); *B29D 11/00865* (2013.01); *G02C 7/104* (2013.01); *G02C 7/107* (2013.01)

(58) Field of Classification Search
CPC .......... G02C 7/02; G02C 7/104; G02C 7/107; G02B 1/115; G02B 5/283; B29D 11/00009; B29D 11/00865

(Continued)

(56) References Cited

U.S. PATENT DOCUMENTS

| 5,316,791 A | 5/1994 | Farber et al. |
| 6,538,092 B1 | 3/2003 | Terry et al. |

(Continued)

FOREIGN PATENT DOCUMENTS

| DE | 102011083960 A1 | 4/2013 |
| EP | 2578649 A1 | 4/2013 |

(Continued)

OTHER PUBLICATIONS

Brainard et al., "Action Spectrum for Melatonin Regulation in Humans: Evidence for a Novel Circadian Photoreceptor," The Journal of Neuroscience, Aug. 15, 2001, 21(16), pp. 6405 to 6412.

(Continued)

*Primary Examiner* — Tuyen Tra

(74) *Attorney, Agent, or Firm* — Tautz & Schuhmacher LLC; Georg Hasselmann

(57) ABSTRACT

A spectacle lens for an eye of a wearer of spectacles has a front surface and a back surface, wherein the front surface of the spectacle lens faces away from the eye and the back surface of the spectacle lens faces the eye. The spectacle lens includes an optical lens substrate made of or containing mineral glass and/or organic glass, wherein the spectacle lens has at least one first antireflection coating and at least one second antireflection coating, wherein the at least one first antireflection coating has a filter effect for blue light. Further, spectacles containing the spectacle lens are also disclosed.

22 Claims, 3 Drawing Sheets

(58) Field of Classification Search
USPC .................................................. 351/41, 44
See application file for complete search history.

(56) References Cited

U.S. PATENT DOCUMENTS

| | | | |
|---|---|---|---|
| 9,778,484 B2 | 10/2017 | Faul et al. | |
| 9,957,398 B2 | 5/2018 | Hugenberg et al. | |
| 9,995,950 B2* | 6/2018 | Kraus | G02C 7/107 |
| 10,330,953 B2 | 6/2019 | De Ayguavives et al. | |
| 2008/0221674 A1 | 9/2008 | Blum et al. | |
| 2015/0268396 A1 | 9/2015 | Weber et al. | |
| 2016/0124118 A1 | 5/2016 | Takahashi | |
| 2017/0219848 A1 | 8/2017 | Kraus et al. | |
| 2018/0081084 A1* | 3/2018 | Zhu | G02B 1/111 |
| 2020/0124768 A1* | 4/2020 | Wilson | G02B 3/0068 |
| 2021/0397024 A1 | 12/2021 | Miyamoto | |

FOREIGN PATENT DOCUMENTS

| | | |
|---|---|---|
| EP | 2602654 A1 | 6/2013 |
| EP | 2801846 A1 | 11/2014 |
| EP | 3514612 A1 | 7/2019 |
| EP | 3633417 A1 | 4/2020 |
| EP | 3859436 A1 | 8/2021 |
| WO | 9417116 A1 | 8/1994 |
| WO | 2008067109 A1 | 6/2008 |
| WO | 2013171434 A1 | 11/2013 |
| WO | 2014047724 A1 | 4/2014 |
| WO | 2014055513 A1 | 4/2014 |
| WO | 2019009127 A1 | 1/2019 |
| WO | 2019032348 A1 | 2/2019 |
| WO | 2020067407 A1 | 4/2020 |

OTHER PUBLICATIONS

Gadelmawla et al., "Roughness parameters," Journal of Materials Processing Technology 123 (2002), pp. 133 to 145.
Oliver et al. "Measurement of hardness and elastic modulus by instrumented indentation: Advances in understanding and refinements to methodology," J. Mater. Res., vol. 19, No. 1, Jan. 2004, pp. 3 to 20.
Industrial Norm DIN EN ISO 13666 (Ophthalmic optics—Spectacle lenses), In English and German, dated Oct. 2013.
International Search Report issued in PCT/P2020/073255, to which this application claims priority, and English language translation thereof, dated Nov. 24, 2020.
Written Opinion issued in PCT/P2020/073255, to which this application claims priority, and English language machine translation thereof, dated Nov. 24, 2020.
Industrial Norm DIN 6167, entitled "Beschreibung der Vergilbung von nahezu weißen oder nahezu farblosen Materialien [Description of yellowness of near-white or near-colourless materials]," published Jan. 1980. Relevance is found at least in paragraphs [0030] and [0031] of the instant specification.
Industrial Norm DIN 5033 part 2, entitled "Farbmessung—Normvalenz-Systeme [Colorimetry—Color Space]," published May 1992. Relevance is found at least in paragraph [0032] of the instant specification.
Industrial Norm DIN 5033 part 7, entitled "Farbmessung—Messbedingungen für Körperfarben [Colorimetry—Measuring conditions for object colours]," published Oct. 2014. Relevance is found at least in paragraph [0032] of the instant specification.
Extended European Search Report issued in EP 19192734.2, to which this application claims priority, dated Feb. 26, 2020, and English language machine translation thereof.
International Preliminary Report on Patentability issued in PCT/P2020/073255, to which this application claims priority, completed Dec. 21, 2021, and English language translation thereof.

* cited by examiner

SPECTACLE LENS WITH FILTER EFFECT FOR BLUE LIGHT AND SPECTACLES

CROSS REFERENCE TO RELATED APPLICATIONS

This application is a continuation application of international patent application PCT/EP2020/073255, filed Aug. 19, 2020, designating the United States and claiming priority from European patent application 19192734.2, filed Aug. 21, 2019, and the entire content of both applications is incorporated herein by reference.

TECHNICAL FIELD

The present disclosure relates to a spectacle lens with a filter effect for blue light, and to a pair of spectacles comprising at least one spectacle lens with a filter effect for blue light.

BACKGROUND

The sleep-wake cycle in humans and in many animal species is subject to endogenous rhythms with a period length of around 24 hours. This rhythm is called circadian rhythm in chronobiology. The exact length of the period can vary, but is usually 22 to 25 hours. The circadian rhythm is influenced by external stimuli, also known as zeitgebers. In this context, the light is a significant external stimulus. Other zeitgebers can also be the ambient temperature or social stimuli, for example.

Melatonin is an endogenous hormone that is produced in the pineal gland or epiphysis in the brain. The formation of melatonin is inhibited by light. In the dark, this inhibition is lifted, and melatonin is synthesized and secreted. Outside of the pineal gland, melatonin is also synthesized in the gut and retina of the eye. During the night, the concentration of melatonin in the blood increases by a factor of about 3 to 12. In older people, the increase in melatonin concentration tends to be in the lower range, and in young people, the increase in melatonin concentration tends to be in the upper range. An increased level of melatonin leads to tiredness in humans and is therefore an essential factor for healthy sleep.

The blue component in the ambient light has a significant influence on the endogenous synthesis of melatonin. When the sun sets, there initially is a spectral change in the ambient light in the direction of red, and thus in the direction of the longer-wave component of sunlight, before it finally becomes dark. The natural light from the sun is in a wavelength range from about 380 nm to about 780 nm. In this context, the blue light component extends over a spectral range from about 380 nm to about 500 nm.

The synthesis of melatonin is inhibited if humans are exposed to light sources that emit light with a significant proportion of blue light, especially blue light around 464 nm. As a result, the human stays awake or wakes up again.

The human sleep-wake rhythm is known to be disturbed by the blue light component in the screen light from, for example, stationary or mobile screens or displays, or in LED light in general. The synthesis of the body's own melatonin is inhibited due to the blue light component, as a result of which the person wakes up and consequently is unable to sleep.

The intake of melatonin is also prescribed to prevent possible sleep disorders, especially in older people. In Germany, melatonin requires a prescription. By contrast, in the USA, melatonin is freely available in drugstores. However, taking melatonin for a relatively long period of time is generally not recommended because the long-term effects of taking melatonin have not yet been sufficiently researched.

WO 2008/067109 A1 has disclosed the practice of reducing the proportion of blue light in the ambient light using an ophthalmic system, such as a spectacle lens for example. This ophthalmic system comprises a selective light wavelength filter that significantly reduces the blue light component in the ambient light. In this case, the selective filter is formed by using a dye or a pigment in a coating. By way of example, perylene, porphyrin, coumarin, acridine or derivatives thereof are used as dyes. Alternatively, the selective filter may also contain melanin, lutein or zeaxanthin. In this case, the ophthalmic system according to the teaching of WO 2008/067109 A1 has a complicated structure with a filter layer for blue light and a color balancing layer. Without this color balancing layer, a spectacle wearer experiences a spectral shift in color perception, which is noticeable, for example, in a yellow tinge or orange tinge. Furthermore, the filter for blue light disadvantageously comprises organic dyes or organic pigments, the structure of which can be damaged under harsh ambient conditions, such as elevated temperature, intense light irradiation, etc. The uniform incorporation of the specified organic dyes and pigments into the coating of a spectacle lens is also associated with an increased processing outlay.

WO 2013/171434 A1 discloses a spectacle lens which should not change the circadian rhythm on account of a filter on at least one of the surfaces. For an angle of incidence between 0° and 15°, this filter is intended to provide the at least one surface comprising the filter with an average blue reflection coefficient ($R_{m,b}$) of ≥5% in a wavelength range from 420 nm to 450 nm. The reflectivity curve of this filter should, for an angle of incidence of between 0° and 15°, have a reflection maximum at a wavelength below 435 nm and a full width at half maximum (FWHM) of ≥80 nm and, for an angle of incidence θ between 0° and 15° and for an angle of incidence θ' between 30° and 45°, have a parameter $\Delta(\theta, \theta')=1-[R_\theta \cdot (435 \text{ nm})/R_\theta(435 \text{ nm})] \geq 0.6$. The aim of the reflectivity curve described in WO 2013/171434 A1 and the layer structures mentioned there by way of example is to reduce phototoxic blue light by reflection and not to influence the spectral range of the blue light which influences the circadian rhythm. In contrast thereto, the object of the present disclosure is to alter the transmission of a spectacle lens precisely in this spectral range of the blue light.

EP 3 514 612 A1 relates to a spectacle lens and a pair of spectacles. EP 2 602 654 A1 relates to an ophthalmic filter. EP 2 801 846 A1 relates to an optical element with a coating of high diffusivity. WO 2019/032348 A1 relates to methods, systems and apparatuses for reducing the frequency and/or severity of phototropic reactions or for modulating circadian cycles. U.S. 2008/0221674 A1 relates to a high-performance corneal inlay.

SUMMARY

The object of the present disclosure is to provide a spectacle lens with an improved and/or alternative filter for blue light. The spectacle lens with an improved and/or alternative filter for blue light should typically not result in a spectral color shift in the color perception of a spectacle wearer. There is also a need for spectacle lenses with a long-term stable filter for blue light that are typically made in a simple production process.

The object on which the disclosure is based is achieved by providing a spectacle lens for an eye of a spectacle wearer, the spectacle lens having a front surface and a back surface, the front surface of the spectacle lens facing away from the eye and the back surface of the spectacle lens facing the eye and the spectacle lens comprising an optical lens substrate made of or comprising mineral material and/or organic material, wherein the spectacle lens has at least one first antireflection coating and at least one second antireflection coating, the at least one first antireflection coating having a filter effect for blue light in a wavelength range from 430 nm to 530 nm or in a wavelength range from 400 nm to 500 nm.

Exemplary embodiments of the spectacle lens according to the disclosure are specified below.

The present disclosure also relates to a method for producing a spectacle lens having at least one first antireflection coating with a filter effect for blue light.

The spectacle lens according to the disclosure contains at least one antireflection coating, typically a single antireflection coating, with a filter effect for blue light. This layer, referred to as the first antireflection coating, typically has a high transmission in the wavelength range of visible light between 380 nm and 780 nm outside of the filtered or reflected blue component or blue light component.

In the context of the disclosure, a "filter effect for blue light" is understood to mean that the blue light component of the visible wavelength spectrum that passes through the spectacle lens according to the disclosure is reduced. This reduction can be traced back to interference effects. The reduction in the blue light component may also be traced back to a reflection of the blue light component. The blue light component in the visible wavelength range is typically reduced by an increased reflection at the at least one first antireflection coating of the spectacle lens according to the disclosure. For the wavelength range of visible light that is different from the reflected blue light component, the at least one first antireflection coating has no significant reflection, typically no reflection, but virtually complete transmission, typically complete transmission.

Consequently, the spectacle lens according to the disclosure typically has transmission both in the violet range with a shorter wavelength than the wavelength of blue light and in the greenish blue range, cyan range, blueish green range, green range, yellowish green range, yellow-green range, greenish yellow range, yellow range, yellowish orange range, orange range, reddish orange range, and red range, each with a longer wavelength than the wavelength of blue light.

The colors of visible light are in the wavelength ranges given in Table 1.

TABLE 1

| Color | Wavelength range [nm] |
| --- | --- |
| Violet | 380-450 |
| Blue | 450-482 |
| Greenish blue | 482-487 |
| Cyan (Blue) | 487-492 |
| Blueish green | 492-497 |
| Green | 497-530 |
| Yellowish green | 530-560 |
| Yellow green | 560-570 |
| Greenish yellow | 570-575 |
| Yellow | 575-580 |
| Yellowish orange | 580-585 |
| Orange | 585-595 |
| Reddish orange | 595-620 |
| Red | 620-780 |

The at least one first antireflection coating has a filter effect for blue light, typically in a wavelength range from 430 nm to 530 nm, more typically from 440 nm to 500 nm, even more typically from 450 nm to 490 nm, in particular from 453 nm to 480 nm, with particularity from 457 nm to 475 nm, or typically in a wavelength range from 400 nm to 500 nm, more typically from 410 nm to 490 nm, even more typically from 420 nm to 480 nm, in particular from >430 nm to 470 nm, more particularly from 440 nm to 465 nm, and even more particularly from 445 nm to <457 nm. In the respective remaining wavelength range of visible light between 380 nm and 780 nm, the first antireflection coating of the spectacle lens according to the disclosure has a high transmission, typically in a range of at least 70% to 100%, more typically from at least 80% to 99%, even more typically from at least 90% to 98%, particularly from 95% to 97%, the filter effect for blue light in the specified wavelength ranges typically being in a range from 5% to 40%, more typically from 8% to 35%, even more typically from 10% to 30%, particularly from 12% to 28%.

In this context, the value for the transmission in [%] refers to the ratio of the illuminance of the light transmitted through the at least one first antireflection coating ($I_{trans}$) to the illuminance of the incident light ($I_{inc}$) according to formula (I):

$$\text{Transmission in } [\%] = I_{trans}/I_{inc} \times 100 \qquad (I)$$

The value for the filter effect for blue light in [%] is calculated from the illuminance of the blue light transmitted through the at least one first antireflection coating ($I_{trans,blue}$) and the illuminance of the incident blue light ($I_{inc,blue}$) according to formula (II):

$$\text{Filter effect in } [\%] = (1 - I_{trans,blue}/I_{inc,blue}) \times 100 \qquad (II).$$

The transmission values calculated and/or measured here are arithmetic mean values, with the wavelength-dependent transmission values over the wavelength range under consideration being obtained by arithmetic averaging.

The first antireflection coating typically has at least one maximum of the reflectivity curve, also referred to as reflection maximum below, in a wavelength range from 430 nm to 530 nm, typically from 440 nm to 500 nm, more typically from 450 nm to 490 nm, even more typically from 453 nm to 480 nm, particularly from 457 nm to 475 nm, or typically in a wavelength range from 400 nm to 500 nm, more typically from 410 nm to 490 nm, even more typically from 420 nm to 480 nm, particularly from >430 nm to 470 nm, more particularly from 440 nm to 465 nm, and even more particularly from 445 nm to <457 nm. The first antireflection coating typically has exactly one maximum of the reflectivity curve or exactly one reflection maximum in one of the aforementioned wavelength ranges. In this case, this at least one maximum of the reflectivity curve, typically exactly one maximum of the reflectivity curve, respectively is a maximum value of the reflectivity curve or reflection curve in the aforementioned wavelength ranges and has a reflection value of typically ≥4%. At the maximum value, the $1^{st}$ derivative of the reflection function as a function of wavelength is equal to 0. In the aforementioned wavelength ranges, the full width at half maximum (FWHM) of the reflectivity curve in each case is typically in a range from 20 nm to ≤70 nm, more typically in a range from 25 nm to ≤65 nm, particularly typically in a range from 30 nm to ≤60 nm and most typically in a range from 35 nm to ≤55 nm.

According to the disclosure, the at least one first antireflection coating has a filter effect, which essentially leads to the suppression of melatonin formation, in the wavelength range of the blue light component of the light spectrum. The maximum suppression of melatonin formation occurs at a wavelength of 464 nm (George C. Brainard et al., Action Spectrum for Melatonin Regulation in Humans: Evidence for a Novel Circadian Photoreceptor, The Journal of Neuroscience, Aug. 15, 2001, 21(16):6405-6412, in particular FIG. 5). If the blue emission maximum of a white LED for general lighting purposes is taken as the source for blue light, see FIG. 2, it is noticeable that this is at a wavelength of 450 nm. This is shifted by 14 nm in relation to the wavelength of maximum suppression of melatonin formation. Since the spectral curve of melatonin suppression is very broad and, even at 450 nm, it is more than 90% of the value at 464 nm, see FIG. 1, it is better for the overall effect on melatonin suppression to set the maximum of the reflectivity or reflectivity curve of the first antireflection coating to 450 nm. The latter is particularly preferred if LED-illuminated environments are considered for the application of the first antireflection coating. The inventors have found that, surprisingly, it is possible to reduce the blue light component only in a narrow wavelength range around 464 nm and/or around 450 nm, so that, firstly, the inhibition of melatonin synthesis is counteracted and, secondly, typically, the color spectrum perceived by a spectacle wearer is not noticeably changed, is typically not changed, so that the spectacle wearer typically does not perceive a yellow tinge.

A narrow wavelength range around 464 nm is understood to mean a wavelength range with a full width at half maximum (FWHM) from a range of typically ≤70 nm, more typically ≤65 nm, particularly typically ≤55 nm, and most typically ≤50 nm, in each case with a reflection maximum at 464 nm.

A narrow wavelength range around 450 nm is understood to mean a wavelength range with a full width at half maximum (FWHM) from a range of typically ≤55 nm, more typically ≤50 nm, particularly typically ≤45 nm, and most typically ≤40 nm, in each case with a reflection maximum at 450 nm.

According to an exemplary embodiment of the disclosure, the spectacle lens according to the disclosure typically has a yellow value G of no more than 12, more typically no more than 11, even more typically no more than 10, particularly no more than 9, more particularly no more than 8, even more particularly no more than 7, with particularity no more than 6. In this context, the yellow value G is calculated according to DIN 6167 (January 1980), Equation 1 (see formula (IV) below):

$$G = \frac{a \cdot X - b \cdot Z}{Y} \cdot 100. \quad (IV)$$

The tristimulus values X, Y, Z used in the equation are calculated from the transmission spectrum. Factors a and b can be found in the table given in DIN 6167 (January 1980) (see Table A below):

TABLE A

| Standard illuminant [1] | D 65 | D 65 | C |
|---|---|---|---|
| Normal observer [2] | 10° | 2° | 2° |
| a | 1.301 | 1.298 | 1.277 |
| b | 1.149 | 1.133 | 1.059 |

[1] See DIN 5033 Part 7
[2] See DIN 5033 Part 2

According to an exemplary embodiment of the disclosure, the maximum yellow value G in the case of the spectacle lens according to the disclosure ranges from 6 to 12, typically from 8 to 11.

According to the disclosure, the reflectivity of the first antireflection coating typically remains low so that the spectacle wearer is not disturbed by reflections from the spectacle lens. The reflectivity of the surface of the spectacle lens comprising at least one first antireflection coating is defined by way of the value of the luminous reflectance according to DIN EN ISO 13666:2013-10, section 15.7 (see formula (V) below):

$$\rho_V = \frac{\Phi_R}{\Phi_I} = 100 \times \frac{\int_{380\,nm}^{780\,nm} \rho(\lambda) \cdot V(\lambda) \cdot S_{D65}(\lambda) \cdot d\lambda}{\int_{380\,nm}^{780\,nm} V(\lambda) \cdot S_{D65}(\lambda) \cdot d\lambda} \%, \quad (V)$$

where $\Phi_I$ Is the incident luminous flux;

$\Phi_R$ is the reflected luminous flux.

The value of the luminous reflectance of the surface of the spectacle lens comprising at least one first antireflection coating is typically <3.5%, more typically <3%, even more typically <2.5%, particularly <2.35%, more particularly <2.0%.

As is evident from Table 1, the blue light component is subdivided into a pure blue component ranging from 450 nm to 482 nm and further blueish components, which are referred to as greenish-blue, cyan and blueish-green, for example. Consequently, the blue color tone is not completely filtered out in the case of a reduction in the blue light component in the range from 450 nm to 482 nm, and optionally in the shorter wavelength and longer wavelength blueish spectral range immediately adjacent to the pure blue light component, and so there is no significant shift of the perceived color spectrum, typically not into the yellowish wavelength range, for a spectacle wearer.

In view of the filter effect of the first antireflection coating with a filter effect for blue light in an extremely narrow range around the wavelength of 464 nm and/or 450 nm, the illuminance is specifically reduced in the wavelength range essential to the suppression of melatonin synthesis. In particular, it is advantageous that not all of the blue light component of the visible light is filtered out, but that there is only a selective reduction in the illuminance of the blue light components that lead to a suppression of melatonin synthesis.

In contrast to the disclosure of WO 2008/067109, a color balancing layer for counteracting a substantial spectral shift in a color impression of a spectacle wearer, for example in the form of a significant yellow tinge or an orange tinge, consequently need not be arranged.

Typically, the at least one first antireflection coating of the spectacle lens according to the disclosure has both the above-specified filter effect for blue light and an antireflection effect for the remaining wavelength range of visible light. Consequently, the remaining wavelength range of the visible light is transmitted in substantially unimpeded fashion, typically in unimpeded fashion, through the at least one first antireflection coating.

According to a preferred development of the spectacle lens according to the disclosure, the filter effect for blue light is not implemented on the basis of dyes and/or color pigments contained within the at least one first antireflection coating. According to a preferred embodiment of the disclosure, the spectacle lens according to the disclosure has no colorants, in particular no dyes and/or color pigments, that absorb blue light. Consequently, with regard to the preferred absence of colorants that absorb blue light, the spectacle lens according to the disclosure has a significant long-term stability of typically ≥3 years in relation to the filter effect for blue light.

According to an exemplary embodiment of the disclosure, the filter effect for blue light in the at least one first antireflection coating, typically in the only first antireflection coating, is based on reflection and/or interference, for example partially constructive interference, typically in the wavelength range from 430 nm to 530 nm, more typically from 440 nm to 500 nm, even more typically from 450 nm to 490 nm, particularly from 453 nm to 480 nm, more particularly from 457 nm to 475 nm, or typically in a wavelength range from 400 nm to 500 nm, more typically from 410 nm to 490 nm, even more typically from 420 nm to 480 nm, particularly from >430 nm to 470 nm, more particularly from 440 nm to 465 nm, and even more particularly from 445 nm to <457 nm. The at least one first antireflection coating with a filter effect for blue light typically has increased reflection in the blue light range and increased transmission for the spectral range of visible light outside the reflected blue light component.

The position of the maximum of the reflection curve around 464 nm of the first antireflection coating with a filter effect for blue light can also typically be shifted to shorter wavelengths than 464 nm by up to 15 nm. By choosing shorter wavelengths, it is possible to react to variations in the emission maxima of blue light from technical lighting (LEDs) or from displays. The maximum here is a maximum value of the reflection curve in the spectral range from 405 nm to 550 nm with a reflection value of ≥4%. At the maximum value, the 1st derivative of the reflection function as a function of wavelength is equal to 0.

The suppression of melatonin synthesis or melatonin secretion starts at an illuminance of approximately 30 lux. The melatonin synthesis suppression curve as a function of illuminance is a sigmoid curve. There is an almost linear relationship between illuminance and melatonin synthesis suppression between approximately 100 lux and approximately 1000 lux. The melatonin synthesis suppression curve plateaus above approximately 1000 lux.

The illuminance reaches values between approximately 19,000 lux and 100,000 lux under daylight conditions. By contrast, illuminance levels ranging from 100 lux to 500 lux are usually obtained under artificial lighting.

Consequently, the inhibition of the synthesis of melatonin can be effectively counteracted in the case of artificial lighting or in the case of artificial light, such as the light of an LED, a screen of a computer or a mobile terminal, etc., with filtering or reducing the blue light component by using a spectacle lens according to the disclosure or a pair of spectacles comprising at least one spectacle lens according to the disclosure.

Under daylight conditions ranging from 19,000 lux to 100,000 lux, possible filtering or a possible reduction of the blue light component is of secondary importance or ineffective, and so the suppression of melatonin synthesis which is desired during the daylight phase is not impaired since the sigmoid curve of the melatonin synthesis suppression is far into the plateau region.

In the case of artificial light with an illuminance ranging from approximately 100 lux to 1000 lux, by contrast, there is a reduction, a reduction noticeable by the human body, in the blue light component in the incident light reaching the eye of a wearer of spectacles comprising at least one spectacle lens according to the disclosure or a wearer of the spectacle lens according to the disclosure due to the at least one first antireflection coating with a filter effect for blue light. There is a reduced inhibition of the synthesis of melatonin, that is to say an increased synthesis of melatonin, due to the reduced blue light component. Wearing the spectacle lens according to the disclosure or spectacles comprising at least one spectacle lens according to the disclosure thus facilitates healthy sleep, even if the person has previously been exposed to artificial light, such as that emitted by light-emitting diodes (LED) or by illumination means in screens of computers, telephones or tablets computers, since the synthesis or secretion of melatonin is not suppressed.

According to a preferred embodiment, the at least one first antireflection coating with a filter effect for blue light has at least two optically transparent layers, the optically transparent layers being arranged extensively over one another and typically being arranged directly adjacent to one another, the optically transparent layers essentially consisting of dielectric materials, typically a metal oxide or a plurality of metal oxides, at least one first optically transparent layer having a refractive index $n_1$ and at least one second optically transparent layer having a refractive index $n_2$ and the first refractive index $n_1$ and the second refractive index $n_2$ differing by at least 0.1. "Arranged adjacent to another" is understood in the sense of the disclosure to mean that neighboring layers are arranged directly against one another, that is to say with extensive contact with one another.

"Optically transparent layer" or "optically transparent layers" is understood in the sense of the disclosure to mean that the layer or layers absorbs or absorb substantially no radiation, typically no radiation, for light in the visible spectral range. Substantially no absorption is also understood to mean a possible small amount of absorption. The visible spectral range covers a wavelength range from 380 nm to 780 nm. A small amount of absorption is an absorption value <2%, based on the total incident luminous intensity.

"Transparent" for an individual layer is understood in the sense of the disclosure to mean that at least 20% of the visible light incident on an optically transparent layer passes through the layer. The transmission of a layer is typically in a range from 25% to 100%, more typically from 30% to 98%, more typically from 40% to 95%, more typically from 45% to 90%, more typically from 50% to 85%, more typically from 55% to 80%, more typically from 60% to 75%.

Where at least two optically transparent layers are arranged one over another in a layer package, the transmission is determined by the interference effects. Over the spectral profile, therefore, there may be wavelength ranges with high transmission and wavelength ranges with low transmission. A layer package consisting of at least two optically transparent layers typically has a transmission of more than 20%, typically in a desired wavelength range. The transmission of the overall layer package, in the visible spectral range outside of the filtered blue light component, is typically in a range from 25% to 100%, more typically from 30% to 98%, even more typically from 40% to 95%, particularly from 45% to 90%, more particularly from 50% to 85%, even more particularly from 55% to 80%, with particularity from 60% to 75%.

The visible spectral range covers a wavelength range from 380 nm to 780 nm. "Optically transparent layer" or "optically transparent layers" is understood in the sense of the disclosure, more typically according to an exemplary embodiment of the disclosure, to mean that the materials of which the layers is or are constructed have typically only little absorption, more typically no absorption, in the visible spectral range.

In terms of the optical properties, the optical properties of the materials of which the layers are composed are defined typically by the refractive index n and more typically by the absorption index k. In the spectral range determined by the particular application, optically transparent layer materials typically have an absorption index k<0.008, more typically k<0.005, even more typically k<0.003, particularly k<0.001.

In the sense of the disclosure, the specifications regarding the refractive indices $n_1$ and $n_2$ and the absorption index k relate throughout to the respective refractive index measured at a wavelength of 550 nm.

The conventional refractive index, also called optical density, is a physical optical property. The conventional refractive index is the ratio of the wavelength of light in a vacuum to the wavelength in the material. The refractive index is dimensionless and is generally dependent on the frequency of the light.

The complex refractive index is composed of a real part, that is to say the conventional refractive index, and an imaginary part according to formula (III):

$$n = n_r - ik \qquad (III)$$

The complex refractive index describes both the temporal and the spatial progress of the wave and also its absorption. The real-value component $n_r$, which is usually greater than 1, shortens the wavelength in a medium. The imaginary part k describes the damping of the wave.

The imaginary part k is also referred to as the absorption index or extinction coefficient and represents the imaginary part of a complex number multiplied by the imaginary unit i.

According to the disclosure, each antireflection coating typically has an arrangement of at least two optically transparent layers, with incident light causing reflection and transmission phenomena at the individual optically transparent layers. Constructive and/or destructive interference may also arise in the process. According to a preferred embodiment, the at least one first antireflection coating and the at least one second antireflection coating of the spectacle lens according to the disclosure each consist exclusively of such an arrangement of at least two optically transparent layers in which reflection and/or transmission phenomena occur at the individual optically transparent layers in the case of incident light. Constructive and/or destructive interference may also arise in the process. In this arrangement of layers, the first antireflection coating with a filter effect for blue light in particular typically is in each case a stack of optically transparent layers for generating optical interference, and typically for generating reflection in the blue light component or reflection of the blue light component of the visible wavelength spectrum. As a result of these reflection and transmission phenomena at the various layers of the at least one first antireflection coating and optionally of at least one second antireflection coating, there is a reduction in the intensity of the transmitted light in the blue light component, which creates an optical filter effect. The reduction in the intensity of the transmitted blue light component can typically be traced back to an increased reflection of the blue light component.

The filter effect of the spectacle lens according to the disclosure, in particular the filter effect for blue light, can be adjusted by selecting the materials from which the individual layers of the at least one first antireflection coating consist, their layer thickness and/or the number of layers.

The at least one first antireflection coating to be used according to the disclosure can, for example, have defined values for the reflection, transmission and/or absorption for the visible light incident on the at least one first antireflection coating. The filter effect of the at least one first antireflection coating to be used according to the disclosure can also be present under certain angles of incidence of the incident light. If the incident angle differs from 0°, the filter effect may also relate to the polarized components of the incident light. An angle of incidence of 0° refers to the case where the beam of light strikes vertically onto the surface. Where the incident angle differs from 0°, the incident angle is measured relative to the perpendicular to this surface. The transmission curves and/or reflection curves calculated and/or measured for an angle of incidence of 0° remain approximately true up to at least an optical angle of incidence of 20°. This angular range covers the range of the main viewing directions through a spectacle lens. For optical angles of incidence other than 0°, the reflection of light at a surface or at an interference layer system depends on the polarization state of the light. Light can be unpolarized, p-polarized or s-polarized in relation to the optical plane of incidence. In this case, the optical plane of incidence is spanned by the direction vector perpendicular to the surface and by the direction vector of the incident light. If angles of incidence in an angular range of 0° to 20° are considered, this effect of different reflections for different polarization directions is small; unpolarized light can be assumed as an approximation. In the present case, unpolarized light with an angle of incidence of 0° to 20° was typically taken as a basis.

According to a preferred development of the disclosure, the at least one first antireflection coating with a filter effect for blue light has at least 2 low refractive index optically transparent layers with a refractive index $n_1 < 1.8$ and at least 2 high refractive index optically transparent layers with a refractive index $n_2 \geq 1.8$.

Typically, the at least one first antireflection coating with a filter effect for blue light comprises or consists of a total of 4 to 100, more typically 6 to 80, even more typically 8 to 70, particularly 10 to 60, more particularly 12 to 50, even more particularly 14 to 38, with particularity 16 to 30, low refractive index layers and high refractive index layers. In this case, the low refractive index layers and high refractive index layers are typically arranged alternately. A total of 8 to 16, typically 10 to 14, low refractive index and high refractive index layers have also proven very suitable. In this context, the ranges specified in this paragraph relate to the sum of the low refractive index and high refractive index layers.

According to an exemplary embodiment of the disclosure, the low refractive index optically transparent layers of the at least one first antireflection coating with a filter effect for blue light have a refractive index $n_1$ from a range from 1.3 to 1.78 and are typically selected from the group consisting of silicon oxide, aluminum oxide, magnesium fluoride, and mixtures thereof.

According to a further exemplary embodiment of the disclosure, the high refractive index optically transparent layers of the at least one first antireflection coating with a filter effect for blue light have a refractive index $n_2$ from a range from 2.0 to 2.9 and are typically selected from the group consisting of titanium oxide, iron oxide, niobium oxide, tantalum oxide, zirconium oxide, chromium oxide, cerium oxide, cobalt oxide, and mixtures thereof.

According to a further exemplary embodiment of the disclosure, the low refractive index and high refractive index optically transparent layers of the at least one first antireflection coating with a filter effect for blue light are arranged alternately over one another and typically arranged adjoining one another.

According to an exemplary embodiment, the layer thickness of each optically transparent layer is in a thickness range from 5 nm to 500 nm, typically from 6 nm to 460 nm, more typically from 7 nm to 420 nm, even more typically from 8 nm to 380 nm, even more typically still from 9 nm to 320 nm, particularly 10 nm to 280 nm, more particularly 11 nm to 220 nm, even more particularly 12 nm to 180 nm, even more particularly still 13 nm to 150 nm, with particularity from 14 nm to 120 nm, with more particularity from 15 nm to 110 nm, with even more particularity from 25 nm to 90 nm, with even more particularity still from 30 nm to 80 nm. In this context, the thickness of each layer represents the spatial extent of the layer perpendicular to the surface, or in the direction of the surface normal of the respective location on the surface in the case of curved surfaces. The thickness of each layer is typically set as it is deposited. Before the first layer is deposited, the surface to be coated is typically impinged by ions, for example argon ions.

The at least one first antireflection coating with a filter effect for blue light can have a symmetrical or an asymmetrical layer structure with regard to the layer sequence.

An asymmetric layer structure may come about, for example, from the layer thicknesses of the layers arranged in a layer stack being different from one another according to the arrangement in the layer stack. An asymmetric layer structure may also come about from the metal oxides used in the individual layers being different from one another, so that the resulting structure is not symmetrical.

An asymmetric layer structure may also come about from the two outer layers on the top side and bottom side, respectively, of the at least one first antireflection coating with a filter effect for blue light being different from one another. By way of example, in the case of an alternating arrangement of high refractive index layers, $TiO_2$ layers for example, and low refractive index layers, $SiO_2$ layers for example, the bottom surface of the at least one first antireflection coating with a filter effect for blue light may take the form of an $SiO_2$ layer, and the upper surface of the at least one first antireflection coating with a filter effect for blue light may take the form of a $TiO_2$ layer.

According to another exemplary embodiment, the at least one first antireflection coating and at least one second antireflection coating, which typically each comprise at least two optically transparent layers, each comprise one or more dielectrics, typically at least one metal oxide, in an amount of 95 to 100% by weight, more typically of 97 to 99.5% by weight, even more typically of 98 to 99% by weight, based in each case on the total weight of the respective antireflection coating.

Typically, each optically transparent layer of the antireflection coating consists exclusively of one metal oxide or a plurality of metal oxides. According to another exemplary embodiment, each optically transparent layer of the antireflection coating consists of a single metal oxide.

By "metal oxide(s)" are meant, in the sense of the disclosure, metal oxide hydroxide(s) and metal hydroxide(s) as well, and also mixtures thereof. Very typically the metal oxide or metal oxides is or are pure metal oxide(s).

According to an exemplary embodiment of the disclosure, the at least one first antireflection coating and the at least one second antireflection coating each have a sequence of high refractive index and low refractive index optically transparent layers, typically made of or with dielectrics, more typically made of or with at least one metal oxide.

According to another exemplary embodiment, the low refractive index optically transparent layer has a refractive index $n_1$ from a range from 1.3 to 1.78 and is selected typically from the group consisting of silicon oxide, aluminum oxide, magnesium fluoride, and mixtures thereof. Boron oxide is another possibility for use as low refractive index metal oxide. According to one exemplary embodiment of the disclosure, the aforementioned low refractive index metal oxides are X-ray-amorphous. The refractive index of the low refractive index optically transparent layer is a function of wavelength.

Silicon oxide typically comprises $SiO_2$. In the sense of the disclosure, silicon oxide, more particularly $SiO_2$, is understood to be a metal oxide. In the visible spectral range from 380 nm to 780 nm, the refractive index of a $SiO_2$ layer varies in a range from 1.482 (at 380 nm) to 1.462 (at 780 nm). Here, the value of the refractive index decreases continuously.

Aluminum oxide typically comprises $Al_2O_3$ or AlOOH. Boron oxide typically comprises $B_2O_3$. Magnesium fluoride typically comprises $MgF_2$.

Very typically, the low refractive index optical transparent layer is selected from the group consisting of silicon oxide, aluminum oxide, magnesium fluoride, and mixtures thereof. Silicon oxide, in particular $SiO_2$, is also very typical. Aluminum oxide, in particular $Al_2O_3$, is also very typical. Magnesium fluoride, in particular $MgF_2$, is also very typical. With preference the aforementioned low refractive index metal oxides are X-ray-amorphous.

According to another exemplary embodiment, the high refractive index optically transparent layer has a refractive index $n_2$ from a range from 2.0 to 2.9 and is selected typically from the group consisting of titanium oxide, iron oxide, niobium oxide, tantalum oxide, zirconium oxide, tin oxide, cerium oxide, chromium oxide, cobalt oxide, and mixtures thereof. According to an exemplary embodiment of the disclosure, the aforementioned high refractive index metal oxides are X-ray-amorphous. The refractive index of the high refractive index optically transparent layer is a function of the wavelength.

Titanium oxide typically comprises $TiO_2$. More typically, the $TiO_2$ is in the form of anatase or rutile, more typically still in the form of rutile, very particularly typically in X-ray-amorphous form. The iron oxide is typically in the form of $Fe_2O_3$ (hematite) or $Fe_3O_4$ (magnetite), more typically in the form of $Fe_2O_3$. The niobium oxide is typically in the form of $Nb_2O_5$. The tantalum oxide is typically in the form of $Ta_2O_5$. The zirconium oxide is typically in the form of $ZrO_2$. The tin oxide is typically in the form of $SnO_2$.

Very typically, the high refractive index layer is selected from the group consisting of titanium dioxide, niobium oxide, tantalum oxide, zirconium oxide, and mixtures thereof. With preference the aforementioned high refractive index metal oxides are X-ray-amorphous. In the visible spectral range from 380 nm to 780 nm, the refractive index of a $TiO_2$ layer varies in a range from 2.773 (at 380 nm) to 2.338 (at 780 nm). Here, the value of the refractive index decreases continuously.

According to a further exemplary embodiment of the disclosure, the at least one first antireflection coating with a filter effect for blue light has an alternating layer sequence of at least two optically transparent layers, with the first optically transparent layer having a refractive index $n_1$ and the second optically transparent layer having a refractive index $n_2$, and with $n_1$ and $n_2$ differing typically by 0.1 to 1.4, more typically by 0.2 to 1.3, even more typically by 0.3 to 1.2, even more typically still by 0.4 to 1.1, particularly by 0.5 to 1.0, more particularly by 0.6 to 0.9.

According to a further exemplary embodiment of the disclosure, the at least one first antireflection coating with a filter effect for blue light comprises as at least one low refractive index layer at least one layer of silicon oxide, typically $SiO_2$, and as at least one high refractive index layer at least one layer of titanium oxide, typically $TiO_2$, more typically X-ray-amorphous, the at least one silicon oxide layer and the at least one titanium oxide layer typically being arranged alternately.

Typically, the at least one first antireflection coating with a filter effect for blue light comprises or consists of a total of 4 to 100, typically 6 to 80, more typically 8 to 70, even more typically 10 to 60, even more typically still 12 to 50, particularly 14 to 38, more particularly 16 to 30, titanium oxide layers and silicon oxide layers, the titanium oxide layers and silicon oxide layers typically being arranged alternately. A total of 8 to 16, typically 10 to 14, titanium oxide layers and silicon oxide layers have also proven very suitable. The titanium oxide layers and silicon oxide layers are typically X-ray-amorphous. According to another preferred embodiment of the disclosure, the titanium oxide is $TiO_2$ and the silicon oxide is $SiO_2$.

Typically, the at least one first antireflection coating according to the present disclosure with a filter effect for blue light essentially consists of metal oxide(s), typically metal oxide(s). Due to the metal oxide structure, the at least one first antireflection coating according to the present disclosure with a filter effect for blue light is not susceptible to corrosion. Typically, therefore, there is no need for application of separate anticorrosion layers. Accordingly, even in a corrosive environment, in the presence of water and oxygen, for example, the at least one first antireflection coating with a filter effect for blue light is stable with respect to corrosion.

Moreover, in view of the metal oxide structure, the at least one antireflection coating with a filter effect for blue light has extraordinary stability in relation to elevated temperatures and/or intense sunlight.

According to an exemplary embodiment of the disclosure, the optical lens substrate, typically spectacle lens substrate, comprises or consists of mineral glass, for example silicate glass.

According to a further exemplary embodiment of the disclosure, the optical lens substrate, typically spectacle lens substrate, comprises or consists of organic glass.

The optical lens substrate, typically spectacle lens substrate, can have different geometries, for example biconvex, plano-convex, concave-convex, biconcave, plano-concave, and convex-concave. According to an exemplary embodiment, the optical lens substrate, typically spectacle lens substrate, is a meniscus lens.

The organic glass may consist of or comprise a polymer material selected from the group consisting of polythiourethane, polyepisulfide, polymethyl methacrylate, polycarbonate, polyallyl diglycol carbonate, polyacrylate, polyurethane, polyurea, polyamide, polysulfone, polyallyl, fumaric acid polymer, polystyrene, polymethyl acrylate, biopolymers, and mixtures thereof. The plastics material typically comprises or consists of a polymer material selected from the group consisting of polythiourethane, polyepisulfide, polymethyl methacrylate, polycarbonate, polyallyl diglycol carbonate, polyacrylate, polyurethane, polyurea, polyamide, polysulfone, polyallyl, fumaric acid polymer, polystyrene, polymethyl acrylate, biopolymers, and mixtures thereof.

Very typically, the organic glass comprises or consists of a polymer material selected from the group consisting of polyurethane, polyurea, polythiourethane, polyepisulfide, polycarbonate, polyallyl diglycol carbonate, and mixtures thereof.

Suitable polymer materials are available for example under the tradename MR6, MR7, MR8, MR10, MR20, MR174, CR39, CR330, CR607, CR630, RAV700, RAV7NG, RAV7AT, RAV710, RAV713, RAV720, TRIVEX, PANLITE, MGC 1.76, RAVolution.

The base material of CR39, CR330, CR607, CR630, RAV700, RAV7NG, RAV7AT, RAV710, RAV713 and RAV720 is polyallyl diglycol carbonate. The base material of RAVolution and TRIVEX is polyurea/polyurethane. The base material of MR6, MR7, MR8 and MR10 is polythiourethane. The base material of MR174 and MGC1.76 is polyepisulfide.

The refractive index of the substrates is also a function of the wavelength. In the visible spectral range from 380 nm to 780 nm, the refractive index of for example a substrate based on polythiourethane varies in a range from 1.656 (at 380 nm) to 1.583 (at 780 nm). Here, the value of the refractive index decreases continuously.

According to an exemplary embodiment t of the disclosure, the organic glass is coated with a coating material, such as a polysiloxane-based hardcoat, for example. This coating provides protection from mechanical damage, such as from scratches, for example. According to another exemplary embodiment of the disclosure, a primer coat is arranged between the organic glass and the hardcoat layer, and improves the adhesion of the hardcoat layer to the organic glass.

Hardcoats are applied typically by dip-coating methods or spin-coating methods in liquid form, typically to both surfaces of the organic glass, and are then cured thermally, for example. Depending on the composition of the hardcoat, curing may also take place using UV light. The UV light in this case induces chemical reactions which lead to the full curing of the liquid coating material.

These hardcoats are typically harder than the organic glass. Typically, these coating materials have an indentation hardness of greater than 150 MPa, more typically greater than 250 MPa, measured by means of nanoindentation, also referred to as instrumented indentation testing. The indentation hardness here is determined as specified in Oliver W. C. and Pharr, G. M., "Measurement of hardness and elastic modulus by instrumented indentation: Advances in understanding and refinements to methodology," J. Mater. Res., vol. 19, No. 1, January 2004, pages 3 to 20.

The layer thickness of the cured hardcoat layer ranges, for example, between 2 µm and 5 µm, typically ranges for example between 2.1 µm and 4.3 µm.

In a further embodiment of the disclosure, a liquid primer coat is first applied typically directly to the organic glass, for example by means of dip-coating methods or spin-coating methods. Following thermal drying of this primer coat, it typically has a layer thickness greater than 400 nm, more typically from 500 nm to 1 µm. Typically, a hard coat layer is then applied to this primer coat, as described above. The purpose of the primer coat is to improve the adhesion of the hardcoat layer on the organic glass.

The composition of the primer coat is selected typically from the group consisting of a polyurethane dispersion, a polyurethane-polyurea dispersion, and mixtures thereof. For further reference in this respect, refer to U.S. Pat. No. 5,316,791, more particularly to column 3, line 41 to column 6, line 11, the content of which is hereby incorporated by reference. One commercially 248 available primer is, for example, the primer PR-1165 from SDC TECHNOLOGIES, INC. 45 Parker, Suite 100 Irvine, Calif. 92618 USA.

The refractive index of the primer layer is also a function of the wavelength. In the visible spectral range from 380 nm to 780 nm, the refractive index of a primer layer may vary in a range from 1.537 (at 380 nm) to 1.503 (at 780 nm). Here, the value of the refractive index decreases continuously.

The hardcoat is typically a polysiloxane, obtainable for example by reaction of at least one organosilane and at least one tetraalkoxysilane in the presence of colloidal inorganic oxide, fluoride or oxyfluoride. For further reference in this respect, refer to DE 10 2011 083 960 A1, the content of which is hereby incorporated by reference. A commercially available polysiloxane hardcoat is, for example, MP-1154D from SDC TECHNOLOGIES, INC. 45 Parker, Suite 100 Irvine, Calif. 92618 USA.

The refractive index of the hardcoat layer is also a function of the wavelength. In the visible spectral range from 380 nm to 780 nm, the refractive index of a hardcoat layer may vary in a range from 1.632 (at 380 nm) to 1.60 (at 780 nm) or in a range from 1.505 (at 380 nm) to 1.480 (at 780 nm). Here, the value of the refractive index decreases continuously in each case.

According to the disclosure, the cured hardcoat layer typically has a roughness <8 nm rms, more typically <7 nm rms, even more typically <6 nm rms, even more typically still <5 nm rms, particularly <4 nm rms, more particularly <3 nm rms, even more particularly <2 nm rms, even more particularly still <1 nm rms.

By "rms" is meant the root-mean-squared roughness, also identified as $R_q$. The root-mean-squared roughness rms or $R_q$ represents the standard deviation of the distribution of the surface heights, as elucidated in E. S. Gadelmawla et al., "Roughness parameters," Journal of Materials Processing Technology 123 (2002), pages 133 to 145, section 2.2, the disclosure content for which is hereby incorporated by reference. Mathematically, the root-mean-squared roughness $R_q$ is defined as specified in formula (VI):

$$R_q = \sqrt{\frac{1}{l}\int_0^l \{y(x)\}^2 dx}, \quad (VI)$$

where:
"l" is the measurement length,
"y" is the surface height, and
the length "x" goes from 0 to "1."

The roughness of the hardcoat layer may be adjusted through the choice of the solvent—for example, 1-methoxy-2-propanol, ethanol and/or methanol or mixtures thereof—and/or through the use of at least one flow control additive, examples being silicone surfactant(s) or fluorosurfactant(s).

In light of this typically low surface roughness, the subsequently applied optically transparent layers take the form typically of smooth layers, which typically have correspondingly low roughnesses. The smooth layers lead to defined optical properties, for example defined filter properties.

An adhesion layer which improves the adhesion to the subsequently applied at least one first antireflection coating with a filter effect for blue light and/or the at least one second antireflection coating which typically has no filter effect for blue light can optionally be arranged on the hardcoat layer. By way of example, the adhesion layer may be an inorganic adhesion layer, for example a Cr/SiO$_2$ layer or a ZrO$_2$ layer. The thickness of this adhesion layer is typically chosen such that it has no effect, or only a little effect, on the optical behavior of the interference layer system. The thickness of this adhesion layer is typically ≤6 nm, particularly typically ≤4 nm and very particular typically ≤2 nm.

Then, the at least one first antireflection coating with a filter effect for blue light and the at least one second antireflection coating which has no filter effect for blue light according to a preferred variant are then typically applied to the hardcoat layer or the optional adhesion layer, respectively on the front surface of the spectacle lens by preference and on the back surface of the spectacle lens by preference. Typically, the at least one first and at least one second antireflection coating are metal oxide-containing layers as set forth above.

Application of the at least one first and at least one second antireflection coating is typically brought about by means of the vapor deposition, typically using a conventional vapor deposition system, typically a PVD system (PVD: physical vapor deposition). The further method conditions, such as vacuum vapor deposition rate, inert gas, reactive gas, etc., for example, are adjusted in accordance with manufacturer information and with the desired filter effect for blue light. According to a further exemplary embodiment according to the disclosure, the at least one first and at least one second antireflection coating can also be applied by means of sputtering or chemical vapor deposition (CVD: chemical vapor deposition).

The spectacle lens according to the disclosure can be produced using a method according to the disclosure, the method comprising the following steps:

(a) providing an optical lens substrate with a front surface and a back surface,
(b) optionally applying a primer layer to the front surface and/or the back surface,
(c) optionally applying a hardcoat layer to the primer layer or directly to the front surface and/or back surface of the optical lens substrate,
(d) applying at least one first antireflection coating with a filter effect for blue light, typically to the front surface,
(e) applying at least one second antireflection coating, typically to the back surface, and
(f) optionally applying at least one further layer.

Steps (b) and (c) are typically carried out by dip-coating or spin-coating and subsequent drying and/or curing. Steps (d) and (e) are typically carried out by vapor deposition, more typically by physical vapor deposition (PVD). Before step (d) or (e), an adhesion layer can optionally be applied in each case for the at least one antireflection coating applied in each case.

According to an exemplary embodiment of the disclosure, the at least one first antireflection coating with a filter effect for blue light respectively typically reduces the transmission for blue light at 464 nm or at 450 nm through the spectacle lens by at least 5% to no more than 40%, more typically by at least 8% to no more than 35%, more typically by at least 10% to no more than 30%, even more typically by at least 12% to no more than 28%. According to a further exemplary embodiment, the at least one first antireflection coating with a filter effect for blue light respectively typically reduces the transmission for blue light at 464 nm or at 450 nm through the spectacle lens by at least 10% to no more than 20%, more typically by at least 12% to no more than 19%. The percentage in this case relates to the transmission for blue light at 464 nm or at 450 nm, in each case for a first antireflection coating with a filter effect for the blue light, the filter effect being calculated according to formula (II). According to a further embodiment of the disclosure, the at least one first antireflection coating with a filter effect for blue light reduces the transmission at 464 nm and at 450 nm through the spectacle lens in one of the aforementioned ranges. The transmission of the blue light, calculated according to formula (I), of the at least one first antireflection coating with a filter effect for blue light at 464 nm or at 450 nm is accordingly typically in a range from 60% to 95%, more typically from 65% to 92%, more typically from 70% to 90%, even more typically from 72% to 88%. According to a further exemplary embodiment, the transmission of the at least one first antireflection coating with a filter effect for blue light at 464 nm or at 450 nm through the spectacle lens is typically in each case in a range from 80% to 90%, more typically from 81% to 88%. According to a further exemplary embodiment, the transmission of the at least one first antireflection coating with a filter effect for blue light at 464 nm and at 450 nm is in one of the aforementioned ranges.

According to an exemplary embodiment of the disclosure, the at least one second antireflection coating has no filter effect for blue light. Typically, the at least one second antireflection coating transmits the entire wavelength range of visible light.

According to a further exemplary embodiment of the disclosure, the at least one second antireflection coating also has a filter effect for blue light. Typically, the at least one second antireflection coating transmits the wavelength range of visible light apart from the filtered blue light component.

The inventors have found that, surprisingly, unexpected advantages are obtained by restricting the blue light filter effect.

With the typical restriction of the filter effect for blue light, there is no significant change, typically no change, in the color spectrum perceived by a spectacle wearer, in particular under daylight conditions, for example with an illuminance of 19,000 lux to 100,000 lux. As explained above, the inhibition of melatonin synthesis under daylight conditions is well within the saturation range, that is to say in the plateau range of the sigmoid curve, and so a spectacle wearer does not feel tired as a result of a reduction in the blue light component by typically no more than 40%, by more typically no more than 35%, by even more typically no more than 30%, by even more typically still no more than 25%, by particularly no more than 20%, by more particularly no more than 19%, even more particularly in the narrow blue light wavelength ranges specified above from 430 nm to 530 nm, typically from 440 nm to 500 nm, more typically from 450 nm to 490 nm, even more typically from 453 nm to 480 nm, particularly from 457 nm to 475 nm, or typically in a wavelength range from 400 nm to 500 nm, more typically from 410 nm to 490 nm, even more typically from 420 nm to 480 nm, even more typically still from >430 nm to 470 nm, particularly from 440 nm to 465 nm and more particularly from 445 nm to <457 nm. Typically, there is no noticeable change in the light spectrum perceived by the spectacle wearer, more typically no yellow tinge in the perception, as a result of restricting the filter effect for blue light. Consequently, a spectacle wearer does not perceive a significant color shift, typically does not perceive any color shift, for example no significant shift in a yellow or orange color range.

Under artificial light conditions in which the illuminance ranges for example from 100 lux to 1000 lux, typically from 200 lux to 500 lux, a reduction in the blue light component in a range from 5% to no more than 40% causes the human body to already synthesize or secrete melatonin to a considerable extent, even if the wearer of a pair of spectacles comprising at least one spectacle lens according to the disclosure or the spectacle lens according to the disclosure is exposed to a light source with a blue light component in the range of 464 nm or 450 nm.

Consequently, the wearer of a pair of spectacles comprising at least one spectacle lens according to the disclosure can develop sufficient tiredness to get a healthy sleep, even when using a computer screen, smartphone or tablet computer or when illuminated by LED light. Furthermore, a wearer of a spectacle lens according to the disclosure or a pair of spectacles comprising at least one spectacle lens according to the disclosure does not experience any significant perceptible color shift, typically no perceptible color shift, in the color impression, since approximately 60% to 95%, typically 65% to 90%, more typically 70% to 85%, even more typically 75% to 80%, even more typically still 81% to 88%, of the blue light component are not filtered out of the ambient light.

In view of the virtually linear relationship between the inhibition of melatonin synthesis and the illuminance in a range from about 30 lux to 1000 lux, typically from approximately 100 lux to about 500 lux, an apparently only small reduction in the blue light component in the light spectrum surprisingly already causes a significant reduction in the inhibition of melatonin synthesis.

According to a further exemplary embodiment of the disclosure, the at least one first antireflection coating with a filter effect for blue light is arranged on the front surface of the spectacle lens and the at least one second antireflection coating is arranged on the back surface of the spectacle lens.

According to a further exemplary embodiment, the at least one first antireflection coating with a filter effect for blue light is arranged on the back surface of the spectacle lens and the at least one second antireflection coating is arranged on the front surface of the spectacle lens.

According to the disclosure it is typical that the spectacle lens or the pair of spectacles comprising at least one spectacle lens according to the disclosure only has a single antireflection coating with a filter effect for blue light, this coating then typically being arranged on the front surface of the spectacle lens.

Furthermore, the spectacle lens according to the disclosure may also have at least a first antireflection coating with a filter effect for blue light on the front surface and a first antireflection coating with a filter effect for blue light on the back surface of a spectacle lens.

Irrespective thereof, the spectacle lens according to the disclosure may naturally also have more than one antireflection coating with a filter effect for blue light, for example two antireflection coatings with a filter effect for blue light. By way of example, it is thus possible for both the at least one first antireflection coating and the at least one second antireflection coating to each have a filter effect for blue light. From a production point of view, it may be advantageous to arrange two antireflection coatings with a filter effect for blue light, that is to say respectively one on the front surface and one on the back surface of the spectacle lens.

The at least one second antireflection coating is a conventional antireflection coating if it does not have a filter effect for blue light. By way of example, an arrangement of optically transparent layers made of high refractive index and low refractive index dielectric layers, typically made of layers made of or comprising metal oxide(s), which are arranged extensively above one another and which typically adjoin one another, may likewise be applied as at least second antireflection coating. The at least one second antireflection coating is produced in a manner analogous to the production of the at least one first antireflection coating.

The difference between the at least one first antireflection coating and the at least one second antireflection coating is typically only found in that the at least one first antireflection coating has a filter effect for blue light, as explained above. Consequently, the second antireflection coating typically has a transmission over the entire visible wavelength range in a range from 25% to 100%, more typically from 30% to 98%, even more typically from 40% to 95%, even more typically still from 45% to 90%, particularly from 50% to 85%, more particularly from 55% to 80%, even more particularly from 60% to 75%. Furthermore, a transmission of the second antireflection coating over the entire visible wavelength range is typically in a range from 90% to 100%, more typically from 92% to 99%, even more typically from 94% to 98%, and even more typically still from 95% to 97%.

According to an exemplary embodiment, the at least one second antireflection coating has no filter effect for a wavelength range of the visible light, in particular no filter effect for blue light. Typically, the at least one second antireflection coating essentially serves to avoid light reflections, and consequently serves to improve the transmission. According to a further exemplary embodiment, the spectacle lens according to the disclosure has only a single second antireflection coating.

The calculation of the arrangement and layer thicknesses of the individual high refractive index and low refractive index layers, typically $TiO_2$ layers and $SiO_2$ layers, both for the at least one first antireflection coating with a filter effect for blue light and for the at least one second antireflection coating which typically has no filter effect for blue light, can be computer-based. To calculate an antireflection coating to be used according to the disclosure it is possible, for example, to use the software program OptiLayer, Version 12.37 from OptiLayer GmbH, 85748 Garching b. Munchen, Germany, or the software program Essential MacLeod version 11.00.541 from Thin Film Center Inc., 2745 E Via Rotunda, Tucson, Ariz., USA.

According to a further exemplary embodiment, the spectacle lens according to the disclosure may have further coatings. By way of example, the spectacle lens may have one or more additional layers, for example from the group consisting of color layers, dirt-repellent coatings (top coat), antistatic coatings, photochromic coatings, antifog coatings, and combinations thereof.

The refractive index of the top coat is assumed not to be a function of wavelength. The refractive index of the top coat is typically assumed to be constant at n=1.380 in a wavelength range from 380 nm to 780 nm.

According to an exemplary embodiment of the disclosure, the at least one first antireflection coating with a filter effect for blue light reduces the transmission of blue light at 464 nm or at 450 nm through the spectacle lens, in each case in a range from at least 5% to no more than 40%, and has in each case a maximum yellow value G of no more than 12 and also a luminous reflectance of in each case <3.5%, typically <2.5%.

According to an exemplary embodiment, the first antireflection coating with a filter effect for blue light has a diffusivity which ensures the absorption of water molecules passing through the first antireflection coating into the lens substrate and the release of water molecules from the lens substrate through the first antireflection coating, from an air atmosphere disposed on the side of the antireflection coating facing away from the lens substrate, and which is associated with a moisture current density which, starting from the equilibrium state of the amount of water molecules stored in the lens substrate in an air atmosphere at 23° C. and 50% relative humidity, brings about the settling of the equilibrium state of the amount of the water molecules stored in the lens substrate in an air atmosphere at 40° C. and 95% relative humidity within a time interval which is not longer than the time interval required for the settling of this equilibrium state under corresponding conditions in the case of an uncoated lens substrate that is identical to the lens substrate by more than a time period of length $\Delta t=10$ h, typically by more than a time period of length $\Delta t=9$ h or $\Delta t=8$ h or $\Delta t=7$ h or $\Delta t=6$ h or $\Delta t=5$ h or $\Delta t=4$ h or $\Delta t=3$ h or $\Delta t=2$ h, particularly typically by more than a time period of length $\Delta t=1$ h. The diffusivity of the first antireflection coating with a filter effect means that damage to this coating, such as a scratch, which may arise in everyday use of a spectacle lens, does not lead to local volume changes in the lens substrate and thus to surface deformations of the coated spectacle lens in the presence of moisture.

The spectacle lens may take the form of a semifinished spectacle lens, that is to say of a lens blank having just one optically ready-processed face according to DIN EN ISO 13666:2013-10, paragraph 8.4.2, or of a finished spectacle lens, i.e. of a spectacle lens having two ready-processed optical faces before or after edge processing according to DIN EN ISO 13666:2013-10, paragraph 8.4.6. The semifinished spectacle lenses may take the form of monofocal semifinished spectacle lenses, multifocal semifinished spectacle lenses or varifocal semifinished spectacle lenses according to DIN EN ISO 13666:2013-10, paragraphs 8.4.3, 8.4.4 and 8.4.5. The finished spectacle lenses may be monofocal spectacle lenses, multifocal spectacle lenses, bifocal spectacle lenses, trifocal spectacle lenses, varifocal spectacle lenses or degressive spectacle lenses according to DIN EN ISO 13666:2013-10, paragraphs 8.3.1, 8.3.2, 8.3.3, 8.3.4, 8.3.5 and 8.3.6.

With regard to the spectacle frames, these may be full-rimmed spectacles, half-rimmed spectacles, rimless spectacles, pince-nez, folding spectacles or make-up spectacles. The spectacles may be used as reading glasses, computer glasses, sunglasses, sports glasses, protective goggles or overspecs.

Furthermore, the exemplary embodiments according to the following clauses are particularly typical within the scope of the present disclosure:

Clause 1: A spectacle lens comprising an optical lens substrate and at least one coating, the at least one coating comprising at least one antireflection coating, the reflectivity curve of the at least one antireflection coating having at least one reflection maximum, typically exactly one reflection maximum, in each case at a wavelength $\lambda_0$ from a range from 400 nm to 520 nm, typically from 405 nm to 515 nm, more typically from 410 nm to 510 nm, particularly typically from 415 nm to 505 nm and very particularly typically from a range from 420 nm to 500 nm.

Clause 2: The spectacle lens according to clause 1, wherein the $1^{st}$ derivative of the reflection function as a function of wavelength is equal to 0 at the at least one reflection maximum.

Clause 3: The spectacle lens according to either of the above clauses, wherein the at least one reflection maximum, typically at the wavelength $\lambda 0$, has a reflection of $\geq 4\%$, typically a reflection from a range from 5% to 22%, more typically from 6% to 20%, particularly typically from 8% to 18% and very particularly typically from 10% to 16%.

Clause 4: The spectacle lens according to any one of the preceding clauses, wherein the reflectivity curve has a full width at half maximum (FWHM) from a range from 20 nm to ≤70 nm, more typically in a range from 25 nm to ≤65 nm, particularly typically in a range from 30 nm to ≤60 nm and most typically in a range from 35 nm to ≤55 nm.

Clause 5: The spectacle lens according to any one of the preceding clauses, wherein the reflection at a wavelength from a range from 380 nm to less than the wavelength at which the reflection has reached half the value of the reflection at $\lambda_0$, typically from 390 nm to less than the wavelength at which the reflection has reached half the value of the reflection at $\lambda_0$, particularly typically from a range from 400 nm to less than the wavelength at which the reflection has reached half the value of the reflection at $\lambda_0$, is less than half the reflection at $\lambda_0$.

Clause 6: The spectacle lens according to any one of the preceding clauses, wherein at a wavelength from a range of 380 nm to <$\lambda_0$, typically from 390 nm to <$\lambda_0$, particularly typically from a range from 400 nm to <$\lambda_0$, the reflectivity curve within a wavelength range with a width of at least 10 nm to 20 nm has a reflection of <4%, typically ≤3.5%, more typically ≤3%, particularly typically ≤2.5% very particularly typically ≤2% for each wavelength in this wavelength range.

Clause 7: The spectacle lens according to any one of the preceding clauses, wherein the front surface of the spectacle lens, that is to say the surface of the spectacle lens distant from the eye when the pair of spectacles are used as intended, comprises at least one antireflection coating according to any one of the preceding clauses.

Clause 8: The spectacle lens according to any one of the preceding clauses, wherein the at least one antireflection coating, starting from the surface to be coated therewith, comprises the following layer sequence: $0.45\lambda_0/4$ H; $0.33\lambda_0/4$ L; $2.94\lambda_0/4$ H; $0.23\lambda_0/4$ L; $0.76\lambda_0/4$ H; $0.73\lambda_0/4$ L; $0.59\lambda_0/4$ H; $0.43\lambda_0/4$ L; $2.48\lambda_0/4$ H; $1.01\lambda_0/4$ L; $0.08\lambda_0/4$ H, $\lambda_0$ being selected from a range from 420 nm to 500 nm, H denoting $TiO_2$, $Nb_2O_5$ and/or $Ta_2O_5$ and L denoting $SiO_2$.

Clause 9: The spectacle lens according to any one of the preceding clauses, wherein the at least one antireflection coating, starting from the surface to be coated therewith, has the layer sequence $0.45\lambda_0/4$ $TiO_2$, $0.33\lambda_0/4$ $SiO_2$, $2.94\lambda_0/4$ $TiO_2$, $0.23\lambda_0/4$ $SiO_2$, $0.76\lambda_0/4$ $TiO_2$, $0.73\lambda_0/4$ $SiO_2$, $0.59\lambda_0/4$ $TiO_2$, $0.43\lambda_0/4$ $SiO_2$, $2.48\lambda_0/4$ $TiO_2$, $1.01\lambda_0/4$ $SiO_2$, $0.08\lambda_0/4$ $TiO_2$ and $\lambda_0$ is selected from a range of 420 nm to 500 nm.

Clause 10: The spectacle lens according to any one of the preceding clauses, wherein the at least one antireflection coating, starting from the surface to be coated therewith, has the layer sequence $0.45\lambda_0/4$ $Nb_2O_5$, $0.33\lambda_0/4$ $SiO_2$, $2.94\lambda_0/4$ $Nb_2O_5$, $0.23\lambda_0/4$ $SiO_2$, $0.76\lambda_0/4$ $Nb_2O_5$, $0.73\lambda_0/4$ $SiO_2$, $0.59\lambda_0/4$ $Nb_2O_5$, $0.43\lambda_0/4$ $SiO_2$, $2.48\lambda_0/4$ $Nb_2O_5$, $1.01\lambda_0/4$ $SiO_2$, $0.08\lambda_0/4$ $Nb_2O_5$ and 4 is selected from a range of 420 nm to 500 nm.

Clause 11: The spectacle lens according to any one of the preceding clauses, wherein the at least one antireflection coating, starting from the surface to be coated therewith, has the layer sequence $0.45\lambda_0/4$ $Ta_2O_5$, $0.33\lambda_0/4$ $SiO_2$, $2.94\lambda_0/4$ $Ta_2O_5$, $0.23\lambda_0/4$ $SiO_2$, $0.76\lambda_0/4$ $Ta_2O_5$, $0.73\lambda_0/4$ $SiO_2$, $0.59\lambda_0/4$ $Ta_2O_5$, $0.43\lambda_0/4$ $SiO_2$, $2.48\lambda_0/4$ $Ta_2O_5$, $1.01\lambda_0/4$ $SiO_2$, $0.08\lambda_0/4$ $Ta_2O_5$ and 4 is selected from a range of 420 nm to 500 nm.

Clause 12: The spectacle lens according to any one of the preceding clauses, wherein at least one surface of the substrate comprises at least one adhesion layer comprising or consisting of $ZrO_2$, the at least one adhesion layer typically having a layer thickness in a range of $0.05\lambda_0/4$ $ZrO_2$ to $0.1\lambda_0/4$ $ZrO_2$, facing away from the substrate and typically being arranged directly adjacent to the at least one adhesion layer of at least one antireflection coating, which, starting from the surface of the at least one adhesion layer to be coated therewith, has the layer sequence $0.45\lambda_0/4$ H, $0.33\lambda_0/4$ L, $2.94\lambda_0/4$ H, $0.23\lambda_0/4$ L, $0.76\lambda_0/4$ H, $0.73\lambda_0/4$ L, $0.59\lambda_0/4$ H, $0.43\lambda_0/4$ L, $2.48\lambda_0/4$ H, $1.01\lambda_0/4$ $L_2$, $0.08\lambda_0/4$ H, H denoting $TiO_2$, $Nb_2O_5$ and/or $Ta_2O_5$ and L denoting $SiO_2$, and 4 being selected from a range of 420 nm to 500 nm in each case.

Clause 13: The spectacle lens according to any one of the preceding clauses, wherein the refractive index is wavelength-dependent in each case and respectively is in a range from 2.773 (at 380 nm) to 2.338 (at 780 nm) for each of $TiO_2$ and $Nb_2O_5$, is in a range from 1.482 (at 380 nm) to 1.462 (at 780 nm) for $SiO_2$, is in a range from 2.005 (at 380 nm) to 1.930 (at 780 nm) for $ZrO_2$, and is in a range from 2.450 (at 380 nm) to 2.036 (at 780 nm) for $Ta_2O_5$.

Clause 14: The spectacle lens according to any one of the preceding clauses, wherein the overall layer thickness of the at least one antireflection coating is a range from 450 nm to 600 nm, more typically in a range from 460 nm to 590 nm, particularly typically in a range from 470 nm to 580 nm and most typically in a range from 480 nm to 560 nm.

Clause 15: The spectacle lens according to any one of the preceding clauses, wherein the spectacle lens comprises at least one clean coat layer (top coat) and/or at least one antifog layer. If the spectacle lens comprises at least one clean coat layer but no antifog layer, the at least one clean coat layer typically is the outermost layer of the spectacle lens distant from the substrate. If the spectacle lens comprises at least one antifog layer but no clean coat layer, the at least one antifog layer typically is the outermost layer of the spectacle lens distant from the substrate. If the spectacle lens comprises at least one clean coat layer and at least one antifog layer, the at least one clean coat layer is the outermost layer thereof distant from the substrate. The mean layer thickness of the at least one clean coat layer and of the at least antifog coating are typically each within a range from 1 nm to 50 nm, further typically from 1 nm to 30 nm, more typically from 1 nm to 20 nm and most typically within a range from 1 nm to 10 nm. The layer thickness is in each case typically determined using a scanning electron microscope section image at at least three points, and the arithmetic mean is obtained therefrom while obtaining the respective mean layer thickness.

Clause 16: The spectacle lens according to any one of the preceding clauses, wherein at a wavelength on the shorter wavelength side of $\lambda_0$ from a range from 380 nm to less than the wavelength at which the reflection has reached half the value of the reflection at $\lambda_0$, typically at a wavelength from a range from 400 nm to less than the wavelength at which the reflection has reached half the value of the reflection at $\lambda_0$, the reflectivity curve of the at least one antireflection coating according to any one of clauses 1 to 14, within a wavelength range with a width of at least 10 nm to 20 nm has a reflection of <4%, typically ≤3.5%, more typically ≤3% and very particularly typically ≤2.5% for each wavelength in this wavelength range, and at a wavelength on the longer wavelength side of $\lambda_0$ from a range from greater than the wavelength at which the reflection has reached half the value of the reflection at $\lambda_0$ to 780 nm, the reflectivity curve of the at least one antireflection coating according to any one of clauses 1 to 14 within a wavelength range with a width of at least 100 nm to 200 nm has a reflection of <4%, typically ≤3.5%, more typically ≤3% and very particularly typically ≤2.5% for each wavelength in this wavelength range.

Clause 17: The spectacle lens according to any one of the preceding clauses, wherein the yellow value G of the spectacle lens is a range from 1 to 12, more typically in a range from 2 to 11, particularly typically in a range from 2 to 10 and most typically in a range from 3 to 9. The yellow value G is calculated as described above.

Clause 18: The spectacle lens according to any one of the preceding clauses, wherein the value of the luminous reflectance of the surface of the spectacle lens comprising the at least one antireflection coating according to any one of the preceding clauses is <3.5%, typically <3%, more typically <2.5%, particularly typically <2.35% and most typically <2.0%. The definition of luminous reflectance is given above.

Clause 20: The spectacle lens as claimed in any one of the preceding clauses, wherein the incident light is assumed to be unpolarized light and the angle of incidence of the light is assumed to be in an angular range from 0° to 20°, typically 0°. In this case, the optical plane of incidence is spanned by the direction vector perpendicular to the coated surface and by the direction vector of the incident light.

Clause 21: The spectacle lens according to any one of the preceding clauses, wherein the coating comprises at least one antireflection coating which, starting from the surface to be coated therewith, at least comprises in the direction away from the substrate the layer sequence $0.45\lambda_0/4$ H, $0.33\lambda_0/4$ L, $2.94\lambda_0/4$ H, $0.23\lambda_0/4$ L, $0.76\lambda_0/4$ H, $0.73\lambda_0/4$ L, $0.59\lambda_0/4$ H, $0.43\lambda_0/4$ L, $0.05\lambda_0/4$ $H_i$ to $0.1\lambda_0/4$ $H_i$, $2.48\lambda_0/4$ H, $1.01\lambda_0/4$ L and $0.08\lambda_0/4$ H, in this case H denoting $TiO_2$, $Nb_2O_5$ and/or $Ta_2O_5$; L denoting $SiO_2$; and $H_i$ denoting indium tin oxide (ITO); and $\lambda_0$ is selected from a range of 420 nm to 500 nm in each case. The surface of the spectacle lens coated with the aforementioned layer sequence typically has an electrically antistatic effect.

Clause 22: The spectacle lens as claimed in any one of the preceding clauses, wherein the coating of the spectacle lens comprises at least one hardcoat layer, the at least one hardcoat layer being arranged closer to the substrate in the layer sequence than the at least one antireflection coating. For producing the at least one hardcoat layer, preference is given to using a composition as described in EP 2 578 649 A1, especially in EP 2 578 649 A1, claim 1. More typically, the composition for the production of the at least one hardcoat layer comprises a) at least one silane derivative of the formula $R^1R^2_{3-n}Si(OR^3)_n$ where $R^1$ is an unsubstituted or substituted alkyl group, cycloalkyl group, acyl group, alkyleneacyl group, aryl group or alkylenearyl group, $R^2$ is an organic radical comprising an epoxy group, $R^3$ is an unsubstituted or substituted alkyl group, cycloalkyl group, aryl group or alkylenearyl group and n=2 or 3, and/or a hydrolysis product and/or a condensation product of the silane derivative of the formula $R^1R^2_{3-n}Si(OR^3)_n$,
b) at least one colloidal inorganic oxide, hydroxide, oxide hydrate, fluoride and/or oxyfluoride,
c) at least one epoxy compound having at least two epoxy groups, and
d) at least one catalyst system comprising at least one Lewis acid and at least one thermolatent Lewis acid-base adduct.

The above-described composition for the production of the at least one hardcoat layer comprises the at least one silane derivative of the formula $R^1R^2_{3-n}Si(OR^3)_n$ and/or a hydrolysis product and/or condensation product thereof typically in a proportion from a range from 9% by weight to 81% by weight, further typically from a range from 13% by weight to 76% by weight, more typically from a range from 19% by weight to 71% by weight and most typically from a range from 23% by weight to 66% by weight, based in each case on the total weight of the composition. The aforementioned proportions are based either on the use of one type of silane derivative of the formula $R^1R^2_{3-n}Si(OR^3)_n$ and/or a hydrolysis product thereof and/or condensation product thereof or on the use of a mixture of different silane derivatives of the formula $R^1R^2_{3-n}Si(OR^3)_n$ and/or the respective hydrolysis product thereof and/or the respective condensation product thereof. Silane derivatives used may be, for example, 3-glycidoxymethyltrimethoxysilane, 3-glycidoxypropyltrihydroxysilane, 3-glycidoxypropyl-dimethylhydroxysilane, 3-glycidoxypropyldimethylethoxysilane, 3-glycidoxypropylmethyl-diethoxysilane, 3-glycidoxypropyltrimethoxysilane, 3-glycidoxypropyltriethoxysilane, 3-glycidoxypropyldimethoxymethyl silane, 3-glycidoxypropyldiethoxymethyl silane, and/or 2-(3,4-epoxycyclohexyl) ethyltrimethoxysilane. The silane derivative used is typically 3-glycidoxypropyltrimethoxysilane and/or 3-glycidoxypropyltriethoxysilane.

The above-described composition for the production of the at least one hardcoat layer comprises the at least one colloidal inorganic oxide, hydroxide, oxide hydrate, fluoride and/or oxyfluoride typically in a proportion from a range from 3% by weight to 60% by weight, further typically from a range from 6% by weight to 58% by weight, more typically from a range from 9% by weight to 57% by weight and most typically from a range from 13% by weight to 55% by weight, based in each case on the total weight of the composition. The aforementioned proportions are applicable either in the case of use of a single type of colloidal inorganic oxide, hydroxide, oxide hydrate, fluoride and/or oxyfluoride or in the case of use of a mixture of different colloidal inorganic oxides, hydroxides, oxide hydrates, fluorides and/or oxyfluorides. The inorganic oxide, hydroxide, oxide hydrate may, for example, be a metal oxide, metal hydroxide and/or metal oxide hydrate of or including titanium, typically $TiO_2$, of or including silicon, typically $SiO_2$, of or including zirconium, typically $ZrO_2$, of or including tin, typically $SnO_2$, of or including antimony, typically $Sb_2O_3$, of or including aluminum, typically $Al_2O_3$ or AlO (OH), and/or mixed oxides and/or mixtures thereof. The inorganic oxide, hydroxide, oxide hydrate used is typically a metal oxide, metal hydroxide, metal oxide hydrate of or including titanium, of or including silicon, of or including zirconium, and/or mixtures thereof. The inorganic oxide, hydroxide, oxide hydrate used is more typically a metal oxide, metal hydroxide, metal oxide hydrate of or including silicon, most typically $SiO_2$. Further typically, the inorganic oxide, hydroxide, oxide hydrate has a core-shell structure. In this case, the core typically comprises a metal oxide, metal hydroxide and/or metal oxide hydrate of or including titanium, typically $TiO_2$, or of or including zirconium, typically $ZrO_2$, and the shell typically comprises a metal oxide, metal hydroxide and/or metal oxide hydrate of or including silicon. The inorganic fluoride may, for example, be magnesium fluoride. The at least one colloidal inorganic oxide, hydroxide, oxide hydrate, fluoride and/or oxyfluoride typically in each case has a mean particle size from a range from 3 nm to 70 nm, further typically from a range from 6 nm to 64 nm, more typically from a range from 8 nm to 56 nm, and most typically from a range from 9 nm to 52 nm.

The above-described composition for the production of the at least one hardcoat layer comprises the at least one epoxy compound typically in a proportion from a range from 0.01% by weight to 14% by weight, further typically from a range from 0.07% by weight to 11% by weight, more typically from a range from 0.1% by weight to 6% by weight and most typically from a range from 0.2% by weight to 3% by weight, based in each case on the total weight of the composition. The aforementioned proportions are applicable either in the case of use of a single type of epoxy compound or of a mixture of different epoxy compounds. The at least one epoxy compound may comprise, for example, diglycidyl ether, ethylene glycol diglycidyl ether, propylene glycol diglycol glycidyl ether, butane-1,4-diol diglycidyl ether, hexane-1,6-diol diglycidyl ether, trimethylolpropane triglycidyl ether, triglycidylglycerol and/or trimethylolethane triglycidyl ether. The at least one epoxy compound typically comprises trimethylolpropane triglycidyl ether, butanediol diglycidyl ether and/or hexane-1,6-diol diglycidyl ether.

The above-described composition for the production of the at least one hardcoat layer comprises the at least one catalyst system typically in a proportion from a range from 0.04% by weight to 4% by weight, further typically from a range from 0.1% by weight to 3% by weight, more typically from a range from 0.2% by weight to 2% by weight and most typically from a range from 0.3% by weight to 1% by weight, based in each case on the total weight of the composition. In the at least one catalyst system, the weight ratio of the at least one Lewis acid to the at least one thermolatent Lewis base adduct is typically 20:1 to 2:1, further typically 18:1 to 1:2, more typically 13:1 to 1:1 and most typically 6:1 to 1:1. The at least one Lewis acid used may, for example, be an ammonium perchlorate, magnesium perchlorate, sulfonic acids and/or sulfonic salts, such as trifluoromethanesulfonic acids and/or salts thereof. The at least one Lewis acid used is typically ammonium perchlorate and/or magnesium perchlorate. The at least one thermolatent Lewis acid-base adduct used may, for example, be at least one metal complex, such as aluminum acetylacetonate, iron acetylacetonate and/or zinc acetylacetonate. The at least one thermolatent Lewis acid-base adduct used is typically aluminum acetylacetonate and/or iron acetylacetonate.

The above-described composition for the production of the at least one hardcoat layer may further comprise at least one organic solvent and/or water. The proportions of the individual components described above are used in such a way that they add up to 100% by weight in the composition to be used for the production of the at least one hardcoat layer.

The at least one hardcoat layer typically has a mean thickness from a range from 0.6 μm to 7.1 μm, further typically from a range from 0.8 μm to 6.6 μm, more typically from a range from 1.1 μm to 5.8 μm and most typically from a range from 1.6 μm to 4.9 μm. The mean thickness of the at least one hardcoat layer is typically determined by measuring the spectral reflectivity and/or the spectral transmissivity, in a manner analogous to the measurement of the mean thickness of the primer coat layer, as described below. Alternatively, the mean thickness of the at least one hardcoat layer may also be determined on the basis of a scanning electron microscope section image, in a manner analogous to what is described below for the primer coat layer.

Optionally, the spectacle lens may comprise at least one primer coat layer that is closer to the substrate than the at least one hardcoat layer. The at least one hardcoat layer and the at least one antireflection coating are typically arranged further away from the substrate than the at least one primer coat layer, in this case the at least one primer coat layer representing the layer closest to the substrate and the at least one hardcoat layer representing the layer furthest away from the substrate. The at least one primer coat layer is produced typically using at least one coating composition comprising i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion, more typically at least one aqueous aliphatic polyurethane dispersion or at least one aqueous aliphatic polyester dispersion, and most typically at least one aqueous aliphatic polyurethane dispersion, ii) at least one solvent, and iii) optionally at least one additive.

The proportion of the at least one aqueous aliphatic, cycloaliphatic, aromatic or heteroaromatic polyurethane dispersion, the at least one aqueous aliphatic, cycloaliphatic, aromatic or heteroaromatic polyurea dispersion, the at least one aqueous aliphatic, cycloaliphatic, aromatic or heteroaromatic polyurethane-polyurea dispersion and/or the at least one aqueous aliphatic, cycloaliphatic, aromatic or heteroaromatic polyester dispersion in the coating composition usable for production of the at least one primer coat layer typically has a total proportion from a range from 2% by weight to 38% by weight, further typically from a range from 4% by weight to 34% by weight, further typically from a range from 5% by weight to 28% by weight, more typically from a range from 6% by weight to 25% by weight and most typically from a range from 7% by weight to 21% by weight, based in each case on the total weight of the coating composition. The total proportion here includes both the proportion of only one of the dispersions listed above and a mixture of dispersions listed above.

Typically, the coating composition usable for production of the at least one primer coat layer comprises an aqueous polyurethane dispersion, where the polyurethane typically includes a polyester unit as spacer. Aqueous polyurethane dispersions for use with preference are disclosed in WO 94/17116 A1, especially in WO 94/17116 A1, page 7, lines 11 to 33. The aqueous polyurethane dispersion may have been stabilized with an anionically stabilized acrylic emulsion, as disclosed, for example, in WO 94/17116 A1, especially in WO 94/17116 A1, page 7, lines 33 to 35.

The proportion of the at least one solvent in the coating composition usable for production of the at least one primer coat layer is typically within a range from 69% by weight to 98% by weight, further typically within a range from 68% by weight to 99% by weight, more typically within a range from 81% by weight to 97% by weight and most typically within a range from 89% by weight to 93% by weight, based in each case on the total weight of the coating composition. The aforementioned proportions are applicable both to the use of a mixture of different solvents and to the use of a single solvent.

The coating composition usable for production of the at least one primer coat layer typically comprises at least one organic solvent having a low boiling point of <100° C. at standard pressure and at least one organic solvent having a moderate boiling point from a range from 100° C. to 150° C. at standard pressure. Examples of organic solvents having a low boiling point that may be used include methanol, ethanol, 1-propanol, 2-propanol, tert-butanol, acetone, diethyl ether, tert-butyl methyl ether, tetrahydrofuran, chloroform, 1,2-dichloroethane, methylene chloride, cyclohexane, ethyl acetate, n-hexane, n-heptane and/or methyl ethyl ketone. Typical organic solvents having a low boiling point used are methanol, ethanol, 1-propanal and/or 2-propanol.

Examples of organic solvents having a moderate boiling point that may be used include 1-methoxy-2-propanol, 1-butanol, dibutyl ether, 1,4-dioxane, 3-methyl-1-butanol, 4-hydroxy-4-methyl-2-pentanone, methyl isobutyl ketone and/or toluene. Preferred solvents having a moderate boiling point used are 1-methoxy-2-propanol and/or 4-hydroxy-4-methyl-2-pentanone.

The weight ratio of the at least one organic solvent having a low boiling point to at least one organic solvent having a moderate boiling point is typically 1:1, further typically 1:1.4, more typically 1:1.5 and most typically 1:1.7.

The coating composition usable for production of the at least one primer coat layer may additionally comprise water as solvent as well as at least one organic solvent having a low boiling point and at least one organic solvent having a moderate boiling point. In this case, the weight ratio of the at least one organic solvent having a low boiling point to at least one organic solvent having a moderate boiling point to water is typically 2:7:1, further typically 2.5:6.5:1, further typically 3:6:1, more typically 3:5:1 and most typically 3:6:1.

The at least one primer coat layer typically has a mean thickness from a range from 300 nm to 1200 nm, further typically from a range from 340 nm to 1150 nm, further typically from a range from 390 nm to 1120 nm, more typically from a range from 440 nm to 1110 nm and most typically from a range from 470 nm to 1100 nm. What is meant by mean thickness is the arithmetic mean of the thickness of the respective primer coat layer measured in at least three places. The mean thickness of the at least one primer coat layer is typically determined after application and drying using a spectacle lens comprising at least one primer coat layer. The mean thickness of the at least one primer coat layer is typically determined by means of measurement of spectral reflectivity and/or spectral transmissivity. The mean thickness of the at least one primer coat layer is typically determined using an optical spectrometer from Filmetrics Inc., for example the optical spectrometer F20, F10-HC or F10-AR. More typically, the mean thickness of the at least one primer coat layer is determined using the F10-HC optical spectrometer (from Filmetrics Inc.). Illumination of the spectacle lens comprising at least one primer coat layer using white light gives rise to interference spectra as a function of the geometric layer thickness and refractive index of the respective layer. Incidence of white light gives rise to interferences at optically transparent layers since, for particular wavelengths, the path difference is an exact multiple of the optical layer thickness. The layer thickness is typically calculated by the fast Fourier transformation (FFT) method. In the FFT method, the geometric layer thickness is calculated from the periodicity of the interference spectrum. Alternatively, the mean thickness of the at least one primer coat layer can be determined using at least one scanning electron microscope section image or at least one transmission electron microscope section image of a spectacle lens comprising at least one primer coat layer. For this purpose, the thickness of the respective primer coat layer is ascertained in at least three places and the arithmetic mean is formed.

The coating composition usable for production of the at least one primer coat layer is applied to at least one surface of the substrate or to at least one layer that is different from the primer coat layer. This coating composition is typically dried by evaporation of the at least one solvent present in the coating composition. This coating composition is typically dried at a temperature from a range from 20° C. to 80° C., further typically from a range from 23° C. to 78° C., more typically from a range from 35° C. to 76° C. and most typically at 45° C. to 75° C.

The coating composition for production of the at least one primer coat layer may optionally comprise at least one additive. The at least one additive here may be a dispersant, an antisettling agent, a wetting agent, including an anti-crater additive or a leveling additive, a biocide, a UV absorber and/or a mixture thereof. The coating composition for production of the at least one primer coat layer comprises the at least one additive optionally present typically in a proportion from a range from 0.01% by weight to 1.7% by weight, further typically in a proportion from a range from 0.07% by weight to 1.4% by weight, more typically in a proportion from a range from 0.09% by weight to 1.1% by weight and most typically in a proportion from a range from 0.1% by weight to 0.7% by weight, based in each case on the total weight of the coating composition. The aforementioned proportions are applicable either to the use of one type of additive or to the use of a mixture of different additives.

The proportions of the individual components described above are used in such a way that they add up to 100% by weight in the coating composition to be used for the production of the at least one primer coat layer.

The coating composition usable for production of the at least one primer coat layer is typically applied to at least one surface to be coated herewith by means of dip-coating or spin-coating.

Clause 23: The spectacle lens according to any one of the preceding clauses, wherein the at least one antireflection coating according to any one of the preceding clauses has a diffusivity which ensures the absorption of water molecules passing through the at least one antireflection coating into the lens substrate and the release of water molecules from the lens substrate through the at least one antireflection coating, from an air atmosphere disposed on the side of the antireflection coating facing away from the lens substrate, and which is associated with a moisture current density which, starting from the equilibrium state of the amount of water molecules stored in the lens substrate in an air atmosphere at 23° C. and 50% relative humidity, brings about the settling of the equilibrium state of the amount of the water molecules stored in the lens substrate in an air atmosphere at 40° C. and 95% relative humidity within a time interval which is not longer than the time interval required for the settling of this equilibrium state under corresponding conditions in the case of an uncoated lens substrate that is identical to the lens substrate by more than a time period of length $\Delta t=10$ h, typically by more than a time period of length $\Delta t=9$ h or $\Delta t=8$ h or $\Delta t=7$ h or $\Delta t=6$ h or $\Delta t=5$ h or $\Delta t=4$ h or $\Delta t=3$ h or $\Delta t=2$ h, particularly typically by more than a time period of length $\Delta t=1$ h. The diffusivity of the at least one antireflection coating with a filter effect typically means that damage to the coating, such as a scratch, which may arise in everyday use of a spectacle lens, does not lead to local volume changes in the lens substrate and thus to surface deformations of the coated spectacle lens in the presence of moisture.

Clause 24: A method for producing a spectacle lens comprising an optical lens substrate and at least one coating, the coating comprising at least one antireflection coating according to any one of the preceding clauses and the method comprising at least the following steps:

providing an optical lens substrate comprising a coated or uncoated front surface and a coated or uncoated back surface, and depositing the at least one antireflection coating in vacuo, optionally under ion bombardment.

Before the at least one antireflection coating is deposited in vacuo, the surface to be coated therewith is typically likewise bombarded by ions, typically Ar ions, in vacuo, typically under a pressure ranging from $2 \times 10^{-3}$ mbar to $2 \times 10^{-4}$ mbar.

The individual layers materials of the at least one antireflection coating are heated in vacuo, typically under a pressure ranging from $2 \times 10^{-3}$ mbar to $2 \times 10^{-4}$ mbar, such that these evaporate and are deposited as a layer on the surface to be coated. Heating can be brought about using an electron beam gun or an electrical resistance evaporator. At the same time, oxygen can be added as a reactive gas.

BRIEF DESCRIPTION OF THE DRAWINGS

The disclosure will now be described with reference to the drawings wherein.

DESCRIPTION OF EXEMPLARY EMBODIMENTS

Figure 4:
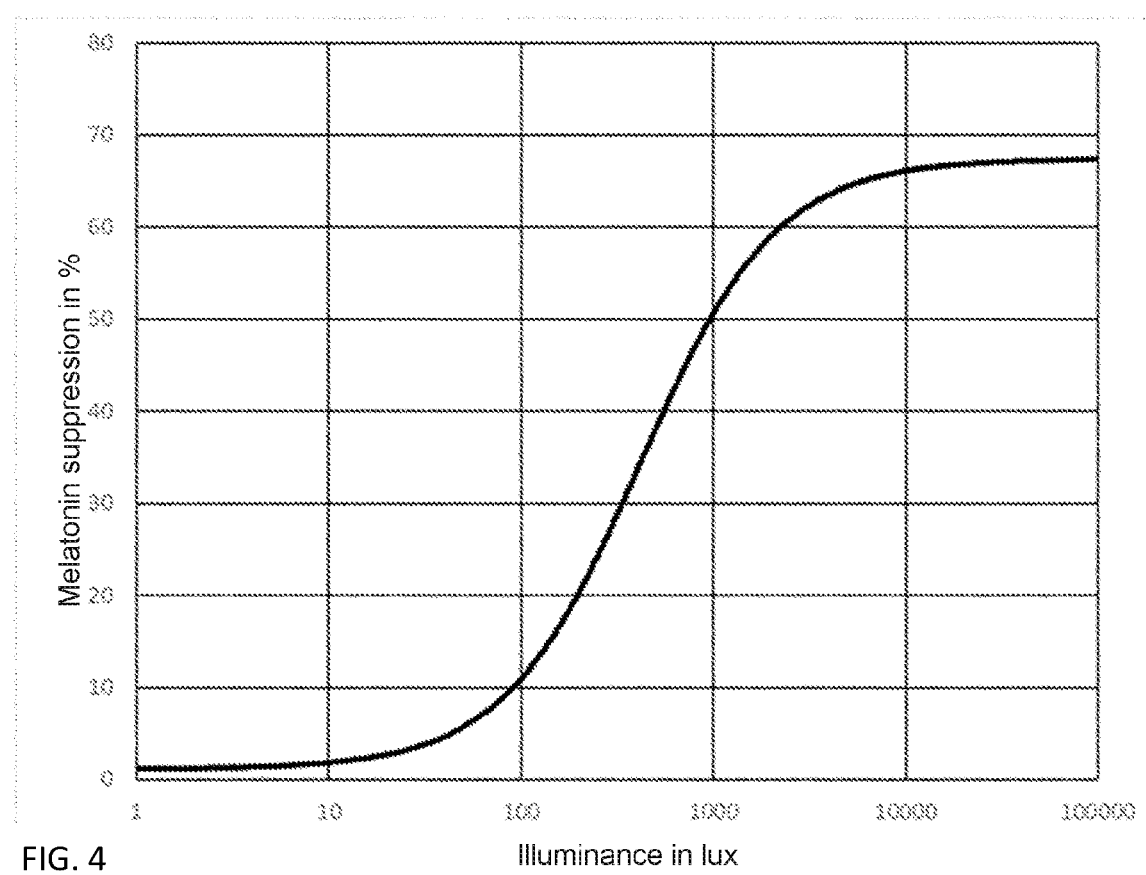
FIG. 4 shows the melatonin suppression as a function of illuminance.
Figure 5:
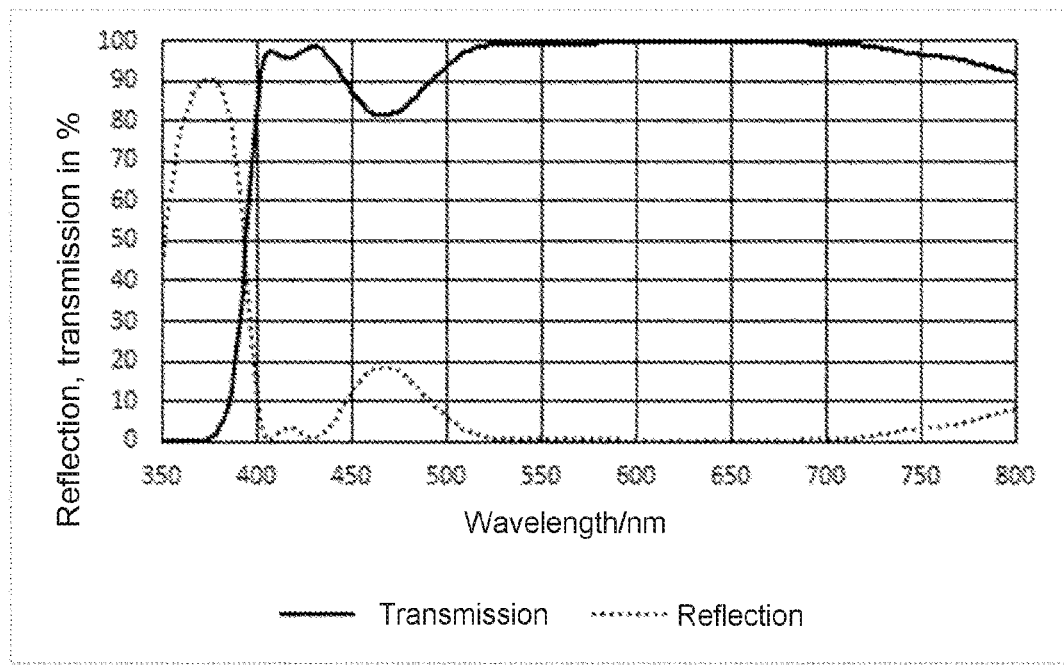
FIG. 5 shows the transmission (Ta) curve and reflection (Ra) curve of a spectacle lens according to the disclosure.
Figure 6:
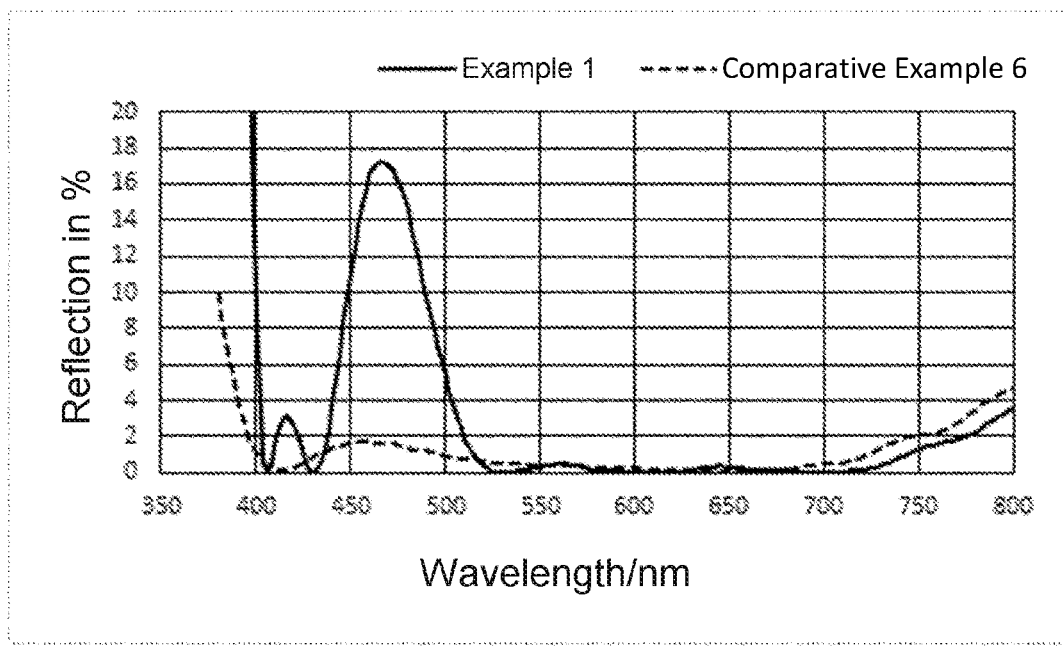
FIG. 6 shows the reflection curves of an antireflection coating with a filter effect for blue light and an antireflection coating without a filter effect for blue light.

The transmission and reflection curves shown in FIGS. 4 to 6 relate to an optical angle of incidence of 0°. The calculated and/or measured values of the transmission curves and/or reflection curves apply up to an optical angle of incidence of at least 20°, without the characteristics of the spectacle lens according to the disclosure changing significantly. This angular range covers the range of the main viewing directions through a spectacle lens.

Figure 1:
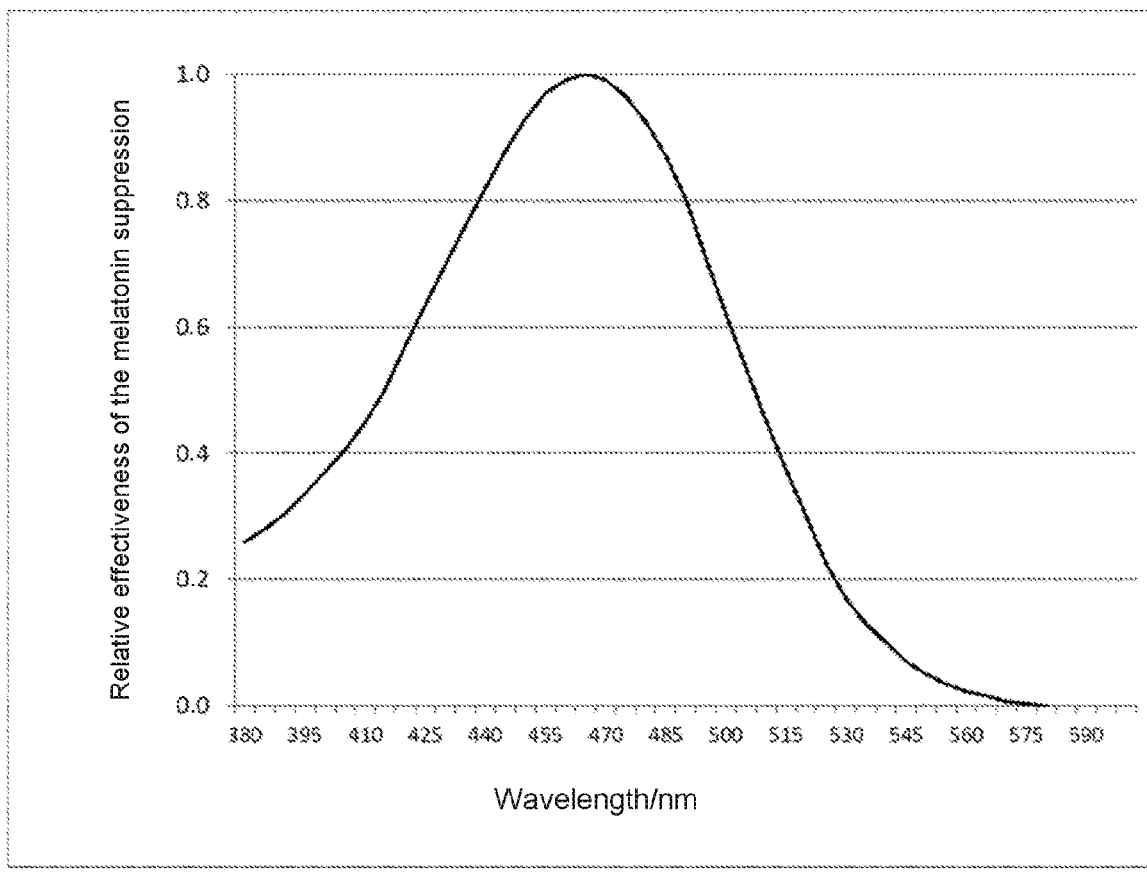
FIG. 1 shows the spectral curve of the relative effectiveness of the suppression of the formation of melatonin as a function of wavelength.

FIG. 1 shows the inhibition of melatonin synthesis as a function of the spectral distribution of the blue light component in humans, as known from the related art. The maximum inhibition of melatonin synthesis occurs at 464 nm.

Figure 2:
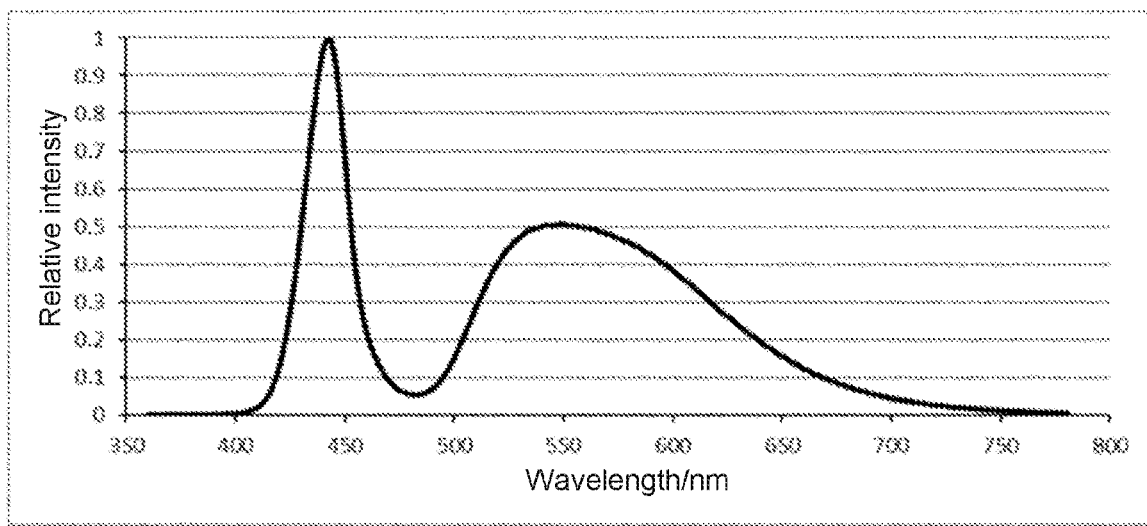
FIG. 2 shows the spectral curve of the emission of a white LED for lighting purposes.

FIG. 2 shows the spectral curve of the emission of visible light from a white LED for lighting purposes. The normalized intensity maximum of the blue light component is in the region of around 464 nm.

Figure 3:
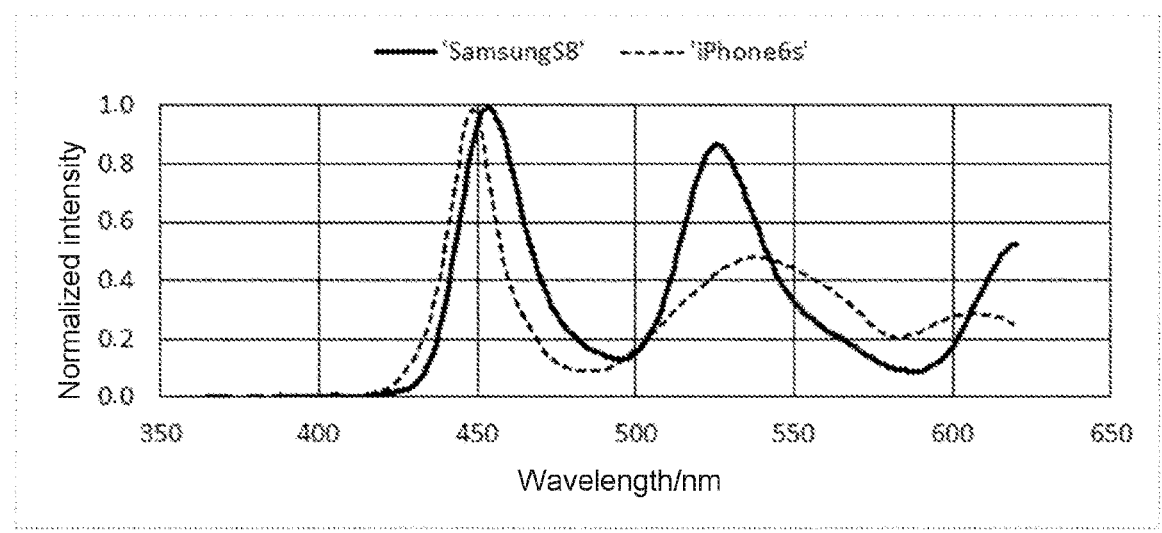
FIG. 3 shows the spectral curve of the emission of two smartphone screens.

FIG. 3 shows the spectral curves of the light emitted by the screen of a Samsung Galaxy S8® and by the screen of an iPhone® 6s (manufacturer: Apple Inc.), respectively. Here, too, the intensity maximum is in the region of around 464 nm.

FIG. 4 shows the percentage inhibition of melatonin synthesis (in short: melatonin suppression) as a function of illuminance at eye level. This curve is a sigmoid curve, with a virtually linear relationship with the percentage inhibition of melatonin synthesis between 100 lux and 1000 lux. The inhibition saturates, that is to say transitions into a plateau region, above an illuminance of approximately 1000 lux. Consequently, the inhibition of melatonin synthesis between 100 lux and 1000 lux, in particular between 100 lux and 500 lux, can be influenced significantly by filtering the blue light component in a region of around 464 nm.

FIG. 5 shows the transmission curve and reflection curve of a spectacle lens according to the disclosure which was produced according to an exemplary embodiment according to the disclosure. The spectacle lens is provided with a primer layer and a hardcoat layer on both sides. The antireflection coating according to Example 1 which has a filter effect for blue light is applied to the front surface of the spectacle lens and the antireflection coating according to Example 6 which has no filter effect for blue light is applied to the back surface. The spectacle lens according to the disclosure has a virtually constant transmission over a wavelength range from approximately 400 nm to 800 nm. The transmission is attenuated by approximately 20% around 464 nm. This attenuation is not noticeable by a spectacle wearer under daylight conditions, and so the color perception of the spectacle wearer is not impaired, for example by way of a spectral change. The reflection curve correspondingly shows the proportion of reflected blue light.

FIG. 6 shows a comparison of the reflection curves of the antireflection coating according to Example 1, which has a filter effect for blue light, and the antireflection coating according to Comparative Example 6, which has no filter effect for blue light. It is quite evident that the antireflection coating according to Example 1 significantly reduces the blue light component around 464 nm on account of an increased reflection, whereas the antireflection coating according to Comparative Example 6 does not bring about any substantial reduction in the blue light component.

EXAMPLES

The plastics substrate material was a finished spectacle lens made of the polythiourethane polymer (MR-8, Mitsui Chemical, Inc.) and having a circular diameter of 6.5 cm and a thickness in the middle of 1.5 mm. According to DIN EN ISO 13666:2013-10, paragraph 8.4.6, a finished spectacle lens is a spectacle lens with two finished optical surfaces. First of all, a polysiloxane-based hardcoat according to U.S. Pat. No. 6,538,092 B1, Example 1, had been applied by dip-coating in a layer thickness of 2500 nm to the plastic substrate material. Drying and curing then took place for 120 min at a temperature of 110° C. in a ULE 600 vertical oven from Memmert GmbH+Co. KG D-91126 Schwabach, Germany.

The finished spectacle lens coated with the hardcoat was then arranged in the 1200-DLF coating system, Satisloh GmbH, D-35578 Wetzlar, Germany, in accordance with the manufacturer's instructions.

Before the actual deposition of the layer materials commenced, the surface was bombarded with ions in vacuo at a pressure of less than $8 \times 10^4$ mbar. The ions came from an End-Hall-type ion source. This ion source is part of the coating unit. The ions were Ar ions with an energy of between 80 eV and 130 eV. The ion current density reaching the substrates was between 20 and 60 $\mu A/cm^2$. Bombardment with Ar ions took place for 2 minutes.

Application of an Antireflection Coating with a Filter Effect for Blue Light

Subsequently, a total of 10 and 11 layers of $TiO_2$ and $SiO_2$, respectively, were applied in vacuo at a pressure of $4 \times 10^{-4}$ mbar to the front surface of the finished spectacle lens on which the hardcoat had been provided, as specified in Table 2 These 10 or 11 layers represented the first antireflection coating with a filter effect for blue light. During the application of the $TiO_2$ layers, oxygen was added as reactive gas (20 sccm), so that the layers grew without absorption in the visible spectral range and were therefore optically transparent. During the deposition of the $TiO_2$, the substrate was also bombarded with ions. These ions came from an End-Hall-type ion source. This ion source is part of the coating unit. The ions were oxygen ions with an energy of between 80 eV and 130 eV. The ion current density reaching the substrates was between 20 and 60 $\mu A/cm^2$. The bombardment of the growing $TiO_2$ layer with oxygen ions, like the addition of reactive gas, was a contributing factor to the growth of the $TiO_2$ layers in the form of an optically transparent layer. Here, layers of $TiO_2$ and layers of $SiO_2$ were applied in alternation. The first metal oxide layer applied directly to the hardcoat was a $TiO_2$ layer. The respectively applied layer thickness of the $TiO_2$ layer and $SiO_2$ layer is specified in [nm] in Table 2 and Table 3, respectively. The transmission at 464 nm and the transmission at 450 nm, the luminous reflectance and the corresponding yellow value G and the full width at half maximum are also given in Table 2 and Table 3, respectively. The following abbreviations are used in Tables 2 and 3:

t/nm: Layer thickness in [nm]
T (464 nm): Transmission at 464 nm
T (450 nm): Transmission at 450 nm
Lum R: Luminous reflectance
FWHM: Full width at half maximum.

TABLE 2

Antireflection coating with filter effect for blue light with a reflection maximum at 464 nm

|  | Example 1 | Example 2 | Example 3 | Example 4 |
|---|---|---|---|---|
| T (464 nm) | 82% | 88% | 88% | 92% |
| Yellow value G | 12 | 9 | 9 | 6 |
| Lum R in % | 2.3 | 1.7 | 1.7 | 1.4 |
| FWHM in nm | 48 | 48 | 48 | 45 |
|  | t/nm | t/nm | t/nm | t/nm |
| Hardcoat | 3000 | 3000 | 3000 | 3000 |
| $TiO_2$ | 25 | 21 | 21 | 21 |
| $SiO_2$ | 26 | 26 | 26 | 25 |
| $TiO_2$ | 135 | 135 | 135 | 137 |
| $SiO_2$ | 18 | 18 | 18 | 25 |
| $TiO_2$ | 35 | 35 | 35 | 29 |
| $SiO_2$ | 57 | 57 | 57 | 57 |
| $TiO_2$ | 27 | 27 | 27 | 27 |
| $SiO_2$ | 34 | 34 | 34 | 32 |
| $TiO_2$ | 114 | 114 | 114 | 114 |
| $SiO_2$ | 80 | 80 | 90 | 80 |
| $TiO_2$ | 5 | 4 | — | 4 |
| Top coat | 5 | 5 | 5 | 5 |

TABLE 3

Antireflection coating with filter effect for blue light with a reflection maximum at 450 nm

|  | Example 5 |
|---|---|
| T (450 nm) | 83% |
| Yellow value G | 11 |
| Lum R in % | 1.1 |
| FWHM in nm | 40 |
| t/nm | t/nm |
| Hardcoat | 3000 |
| $TiO_2$ | 22 |

TABLE 3-continued

Antireflection coating with filter effect for blue light with a reflection maximum at 450 nm

|  | Example 5 |
|---|---|
| $SiO_2$ | 21 |
| $TiO_2$ | 124 |
| $SiO_2$ | 25 |
| $TiO_2$ | 30 |
| $SiO_2$ | 59 |
| $TiO_2$ | 24 |
| $SiO_2$ | 30 |
| $TiO_2$ | 109 |
| $SiO_2$ | 92 |
| $TiO_2$ | — |
| Top coat | 5 |

Application of the antireflection coating without a filter effect for blue light Following the application of the antireflection coating with filter effect for blue light on the front surface of the finished spectacle lens which had been provided with a hardcoat, the spectacle lens was turned in the coating system, for the purposes of coating the back surface with a conventional antireflection coating without a filter effect for blue light. Such a conventional coating is known, for example, from U.S. 2017/0219848 A1 (see Table 3 and the associated description), the content of which is hereby incorporated by reference.

The coating was carried out analogously to the application of the antireflection coating with a filter effect for blue light. An adhesion layer of $Cr/SiO_2$ was vapor deposited between the hardcoat layer and the antireflection coating. The layer thicknesses applied in each case and the respective coating materials are specified in Table 4.

TABLE 4

Antireflection coating without a filter effect for blue light

|  | Example 6 |
|---|---|
|  | t/nm |
| Hardcoat | 3000 |
| Adhesion layer ($Cr/SiO_2$) | 0.6 |
| $Al_2O_3$ | 20.0 |
| $SiO_2/Al_2O_3$ | 170.0 |
| $TiO_2$ | 15.0 |
| $SiO_2/Al_2O_3$ | 47.0 |
| ITO | 3.0 |
| $TiO_2$ | 29.8 |
| $SiO_2/Al_2O_3$ | 114.0 |
| Top coat | 5.0 | t/nm: Thickness in [nm]
ITO: Indium tin oxide

Application of a Top Coat

A protective layer that is both hydrophobic and oleophobic was applied to the first and second antireflection layers as the outermost layer (top coat). This top coat is dirt-repellent and makes cleaning the spectacle lens easier.

A 5 nm thick layer of Duralon$^{UltraTec}$ (Cotec GmbH, 63791 Karlstein a. Main, Germany) was applied to the first surface of the spectacle lens in the PVD system. The Duralon$^{UltraTec}$ was arranged in the PVD system according to the manufacturer's instructions and heated in vacuo with evaporation, so that it subsequently precipitates on the surface of the spectacle lens. The spectacle lens was then turned, and the second surface of the spectacle lens was likewise covered with a 5 nm thick layer of Duralon$^{UltraTec}$.

The respective layer thickness was set via the duration of vapor deposition, in accordance with manufacturer details relating to the coating unit. The respective layer thickness here was determined using a quartz crystal oscillator system (XTC Controller, Inficon, CH-7310 Bad Ragaz, Switzerland) which measures the change in the frequency of an electrical crystal oscillator, the frequency changing with the layer thickness of the respective growing antireflection coating. The crystal oscillator is also coated during the coating procedure, in an analogous way, and the change in frequency is measured at the same time.

A measurement was carried out to check the applied antireflection coating with a filter effect for blue light: The reflection curve was measured using the F10-AR-UV reflection spectrometer from Filmetrics, Inc. (San Diego, Calif. 92121, USA), with the measurement head, after calibration of the instrument according to manufacturer instructions, being placed onto a coated region of the finished spectacle lens directly after production of the interference layer system. This measurement was made within 5 minutes after admission of air to the vacuum coating unit, when coating had been ended.

The layer thicknesses applied in each case were calculated using the OptiLayer software program, version 12.37, from OptiLayer GmbH. A target reflection curve was input initially for the calculation. The software program possessed algorithms which calculate the layer structure of an antireflection coating, taking boundary conditions into account. The algorithm selected for the calculation was "gradual evolution." The boundary conditions stipulated were the substrate material, the primer coat with its optical properties and layer thickness, the hardcoat layer with its optical properties and layer thickness, and the use of $TiO_2$ and $SiO_2$ as layer materials. The calculations of Examples 1 to 4 were based on the following refractive indices n at the wavelength of the reflection maximum of 464 nm: $TiO_2$: n=2.52, $SiO_2$: n=1.47, top coat: n=1.38, hardcoat: n=1.61 and substrate: n=1.605. The calculation of Example 5 was based on the following refractive indices n at the wavelength of the reflection maximum of 450 nm: $TiO_2$: n=2.54, $SiO_2$: n=1.475, top coat: n=1.38, hardcoat: n=1.62 and substrate: n=1.63. The imaginary part k is k=0 for all materials. The maximum number of layers was restricted to 10 and 11, respectively. The algorithm optimized the number of layers and their thickness until a minimum deviation relative to the target curve was achieved. A result of this optimization were the layer thicknesses reported in Table 2. The results of the measured reflection curve agreed with the calculated target reflection curve.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A spectacle lens for an eye of a spectacle wearer, having a front surface and a back surface, the front surface of the spectacle lens facing away from the eye and the back surface of the spectacle lens facing the eye, and the spectacle lens having an optical lens substrate made of or including a mineral material and/or an organic material, the spectacle lens comprising:
    at least one first antireflection coating; and
    at least one second antireflection coating, the at least one first antireflection coating having a filter effect for blue light in a wavelength range from 430 nm to 530 nm or in a wavelength range from 400 nm to 500 nm, a reflectivity curve of the first antireflection coating respectively having, in a wavelength range from 430 nm to 530 nm or in the wavelength range from 400 nm to 500 nm, a reflectivity maximum with a full width at half maximum (FWHM) ranging from 20 nm to ≤55 nm, the at least one first antireflection coating having a transmission from 70% to 100% in a remaining wavelength range of the visible light between 380 nm and 780 nm, the filter effect for blue light being in a range from 5% to 40% in the wavelength range from 400 nm to 500 nm or in the wavelength range from 430 nm to 530 nm.

2. The spectacle lens as claimed in claim 1, wherein a reflectivity of the at least one first antireflection coating has a value of luminous reflectance pursuant to DIN EN ISO 13666:2013-10, section 15.7 of <3.5%.

3. The spectacle lens as claimed in claim 1, wherein the at least one first antireflection coating with the filter effect for blue light has at least two optically transparent layers, the optically transparent layers being arranged extensively over one another, the optically transparent layers essentially consisting of metal oxide or a plurality of metal oxides, at least one first optically transparent layer having a refractive index $n_1$ and at least one second optically transparent layer having a refractive index $n_2$ and the first refractive index $n_1$ and the second refractive index $n_2$ differing by at least 0.1.

4. The spectacle lens as claimed in claim 3, wherein the low refractive index optically transparent layers of the at least one first antireflection coating with the filter effect for blue light have a refractive index $n_1$ within a range from 1.3 to 1.78.

5. The spectacle lens as claimed in claim 4, wherein the low refractive index optically transparent layers of the at least one first antireflection coating with the filter effect for blue light are selected from the group consisting of silicon oxide, aluminum oxide, and magnesium fluoride, or a mixture thereof.

6. The spectacle lens as claimed in claim 3, wherein the high refractive index optically transparent layers of the at least one first antireflection coating with the filter effect for blue light have a refractive index $n_2$ within a range from 2.0 to 2.9.

7. The spectacle lens as claimed in claim 6, wherein the high refractive index optically transparent layers of the at least one first antireflection coating with the filter effect for blue light are selected from the group consisting of titanium oxide, iron oxide, niobium oxide, tantalum oxide, zirconium oxide, chromium oxide, cerium oxide, and cobalt oxide, or a mixture thereof.

8. The spectacle lens as claimed in claim 3, wherein the low refractive index and high refractive index optically transparent layers of the at least one first antireflection coating with the filter effect for blue light are arranged alternately over one another.

9. The spectacle lens as claimed in claim 3, wherein a layer thickness of each optically transparent layer of the at least one first antireflection coating with a filter effect for blue light is in a thickness range from 5 nm to 500 nm.

10. The spectacle lens as claimed in claim 3, wherein the low refractive index and high refractive index optically transparent layers of the at least one first antireflection coating with the filter effect for blue light are arranged adjoining one another.

11. The spectacle lens as claimed in claim 1, wherein the at least one first antireflection coating with the filter effect for blue light has at least 2 low refractive index optically transparent layers with a refractive index $n_1 < 1.8$ and at least 2 high refractive index optically transparent layers with a refractive index $n_2 \geq 1.8$.

12. The spectacle lens as claimed in claim 1, wherein the at least one first antireflection coating with the filter effect for blue light has optically transparent layers which essentially consist of metal oxide(s) and which each contain metal oxide(s) in an amount of 95 to 100% by weight, in each case in relation to an overall weight of the respective optically transparent layer.

13. The spectacle lens as claimed in claim 1, wherein the at least one first antireflection coating with the filter effect for blue light has or consists of 4 to 100 optically transparent layers.

14. The spectacle lens as claimed in claim 1, wherein the at least one first antireflection coating with the filter effect for blue light reduces the transmission for blue light at 464 nm or at 450 nm through the spectacle lens, in each case in a range from at least 5% to no more than 40%.

15. The spectacle lens as claimed in claim 1, wherein the at least one first antireflection coating with the filter effect for blue light is arranged on the front surface of the spectacle lens and the at least one second antireflection coating is arranged on the back surface of the spectacle lens.

16. The spectacle lens as claimed in claim 1, wherein the at least one first antireflection coating with the filter effect for blue light reduces the transmission for blue light at 464 nm or at 450 nm through the spectacle lens, in each case in a range from at least 5% to no more than 40% and in each case has a maximum yellow value G pursuant to DIN 6167 (January 1980) of no more than 12.

17. The spectacle lens as claimed in claim 1, wherein the at least one first antireflection coating with the filter effect for blue light has a diffusivity which ensures absorption of water molecules passing through the first antireflection coating into the lens substrate and release of water molecules from the lens substrate through the first antireflection coating, from an air atmosphere disposed on a side of the antireflection coating facing away from the lens substrate, and which is associated with a moisture current density which, starting from an equilibrium state of an amount of water molecules stored in the lens substrate in an air atmosphere at 23° C. and 50% relative humidity, brings about settling of an equilibrium state of the amount of the water molecules stored in the lens substrate in an air atmosphere at 40° C. and 95% relative humidity within a time interval which is not longer than the time interval required for the settling of this equilibrium state under corresponding conditions in a case of an uncoated lens substrate that is identical to the lens substrate by more than a time period of length $\Delta t = 10$ h.

18. The spectacle lens as claimed in claim 17, wherein the time interval has a time period of length $\Delta t = 9$ h or $\Delta t = 8$ h or $\Delta t = 7$ h or $\Delta t = 6$ h or $\Delta t = 5$ h or $\Delta t = 4$ h or $\Delta t = 3$ h or $\Delta t = 2$ h.

19. The spectacle lens as claimed in claim 17, wherein the time interval has a time period of length $\Delta t = 1$ h.

20. A method for producing a spectacle lens as claimed in claim 1 with at least a filter effect for blue light, the method comprising the following steps:
 (a) providing an optical lens substrate with a front surface and a back surface;
 (b) optionally, applying a primer layer to the front surface and/or the back surface;
 (c) optionally, applying a hardcoat layer to the primer layer or directly to the front surface and/or back surface of the optical lens substrate;
 (d) applying the at least one first antireflection coating with a filter effect for blue light in the wavelength range from 430 nm to 530 nm or in the wavelength range from 400 nm to 500 nm, to the front surface or the back surface;
 (e) applying the at least one second antireflection coating, to the surface opposite to the at least one first antireflection coating; and
 (f) optionally, applying at least one further layer.

21. The method as claimed in claim 20, wherein the at least one first antireflection coating with the filter effect for blue light in the wavelength range from 430 nm to 530 nm or in the wavelength range from 400 nm to 500 nm is applied to the front surface, and the at least one second antireflection coating is applied to the back surface.

22. A spectacle lens for an eye of a spectacle wearer, having a front surface and a back surface, the front surface of the spectacle lens facing away from the eye and the back surface of the spectacle lens facing the eye, and the spectacle lens having an optical lens substrate made of or including a mineral material and/or an organic material, the spectacle lens comprising:
 at least one first antireflection coating; and
 at least one second antireflection coating, the at least one first antireflection coating having a filter effect for blue light in a wavelength range from 430 nm to 530 nm or in a wavelength range from 400 nm to 500 nm, a reflectivity curve of the first antireflection coating respectively having, in the wavelength range from 430 nm to 530 nm or in the wavelength range from 400 nm to 500 nm, a reflectivity maximum with a full width at half maximum (FWHM) ranging from 20 nm to $\leq 55$ nm, the at least one first antireflection coating having a transmission from 70% to 100% in a remaining wavelength range of the visible light between 380 nm and 780 nm, and a reflectivity of the at least one first antireflection coating having a value of the luminous reflectance pursuant to DIN EN ISO 13666:2013-10, section 15.7 of <3.5%.

* * * * *

UNITED STATES PATENT AND TRADEMARK OFFICE
CERTIFICATE OF CORRECTION

| | | |
|---|---|---|
| PATENT NO. | : 11,586,053 B2 | Page 1 of 1 |
| APPLICATION NO. | : 17/672964 | |
| DATED | : February 21, 2023 | |
| INVENTOR(S) | : Bernhard von Blanckenhagen and Emad Flear Aziz | |

It is certified that error appears in the above-identified patent and that said Letters Patent is hereby corrected as shown below:

In the Specification

In Column 2, Line 39: change "$[R_\theta \cdot (435nm)/R_\theta(435\ nm)]$" to -- $[R_\theta \cdot (435nm)/R_\theta(435\ nm)]$ --

In Column 15, Line 1: change "commercially 248" to -- commercially --

In Column 15, Line 50: change "from 0 to "1."" to -- from 0 to "$l$." --

In Column 19, Line 37: change "Munchen" to -- München --

In Column 21, Line 53: change "4 is selected from" to -- $\lambda_0$ is selected from --

In Column 21, Line 61: change "4 is selected from" to -- $\lambda_0$ is selected from --

In Column 22, Line 7: change "$1.01\lambda_0/4L_2$" to -- $1.01\lambda_0/4L$ --

In Column 22, Line 9: change "4 being selected from" to -- $\lambda_0$ being selected from --

Signed and Sealed this
Fourth Day of April, 2023

*Katherine Kelly Vidal*
Katherine Kelly Vidal
*Director of the United States Patent and Trademark Office*